US010728910B2

(12) United States Patent
Kang et al.

(10) Patent No.: US 10,728,910 B2
(45) Date of Patent: Jul. 28, 2020

(54) APPARATUS AND METHOD FOR ALLOCATING RESOURCE FOR VEHICLE SERVICE

(71) Applicant: Samsung Electronics Co., Ltd., Gyeonggi-do (KR)

(72) Inventors: Hyunjeong Kang, Seoul (KR); June Hwang, Incheon (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 15/508,881

(22) PCT Filed: May 4, 2016

(86) PCT No.: PCT/KR2016/004685
§ 371 (c)(1),
(2) Date: Mar. 3, 2017

(87) PCT Pub. No.: WO2016/182256
PCT Pub. Date: Nov. 17, 2016

(65) Prior Publication Data
US 2018/0063852 A1 Mar. 1, 2018

(30) Foreign Application Priority Data
May 8, 2015 (KR) ........................ 10-2015-0064741

(51) Int. Cl.
H04W 72/10 (2009.01)
H04W 88/08 (2009.01)
(Continued)

(52) U.S. Cl.
CPC .......... H04W 72/10 (2013.01); H04W 72/06 (2013.01); H04W 88/08 (2013.01); B60W 2556/45 (2020.02); H04W 72/087 (2013.01)

(58) Field of Classification Search
None
See application file for complete search history.

(56) References Cited

U.S. PATENT DOCUMENTS

2009/0154379 A1  6/2009  Hayashi et al.
2009/0296680 A1  12/2009  Suzuki et al.
(Continued)

FOREIGN PATENT DOCUMENTS

EP   2120505 A1   11/2009
WO   2013063742 A1   5/2013
WO   2014012244 A1   1/2014

OTHER PUBLICATIONS

3GPP TR 22.885 V0.2.0, "3rd Generation Partnership Project; Technical Specification Group Services and System Aspects; Study on LTE Support for V2X Services," (Release 14), Technical Report, S1-151330, Apr. 23, 2015, 35 pages.

Primary Examiner — Anh Ngoc M Nguyen

(57) ABSTRACT

The present disclosure relates to a pre-$5^{th}$-Generation (5G) or 5G communication system to be provided for supporting higher data rates Beyond $4^{th}$-Generation (4G) communication system such as Long Term Evolution (LTE). Embodiments of the present invention provide apparatus and method for allocating resources to transmit and receive vehicle service information in a vehicle communication system. According to an embodiment of the present invention, a base station includes a control unit for allocating a resource for a user equipment (UE) which provides a second service based on priorities of a used resource allocated for a first service and a requested resource for the second service among total preconfigured resource for a vehicle service, and a transmitter for transmitting the resource allocation information to the UE.

16 Claims, 25 Drawing Sheets

(51) Int. Cl.
*H04W 72/06* (2009.01)
*H04W 72/08* (2009.01)

(56) References Cited

U.S. PATENT DOCUMENTS

| | | | |
|---|---|---|---|
| 2010/0008242 A1* | 1/2010 | Schein | H04L 43/0888 370/252 |
| 2012/0040620 A1* | 2/2012 | Fu | H04B 1/1027 455/63.1 |
| 2012/0207069 A1* | 8/2012 | Xu | H04W 52/0222 370/311 |
| 2014/0195102 A1 | 7/2014 | Nathanson | |
| 2014/0293887 A1* | 10/2014 | Kumar | H04W 74/0833 370/329 |
| 2014/0313901 A1* | 10/2014 | Yacovitch | H04W 28/12 370/236 |
| 2014/0321411 A1* | 10/2014 | Puddle | H04W 76/16 370/329 |
| 2014/0369288 A1* | 12/2014 | Kim | H04W 72/04 370/329 |
| 2015/0195827 A1* | 7/2015 | Feng | H04L 63/0428 380/270 |
| 2015/0208350 A1* | 7/2015 | Li | H04W 72/048 370/336 |

\* cited by examiner

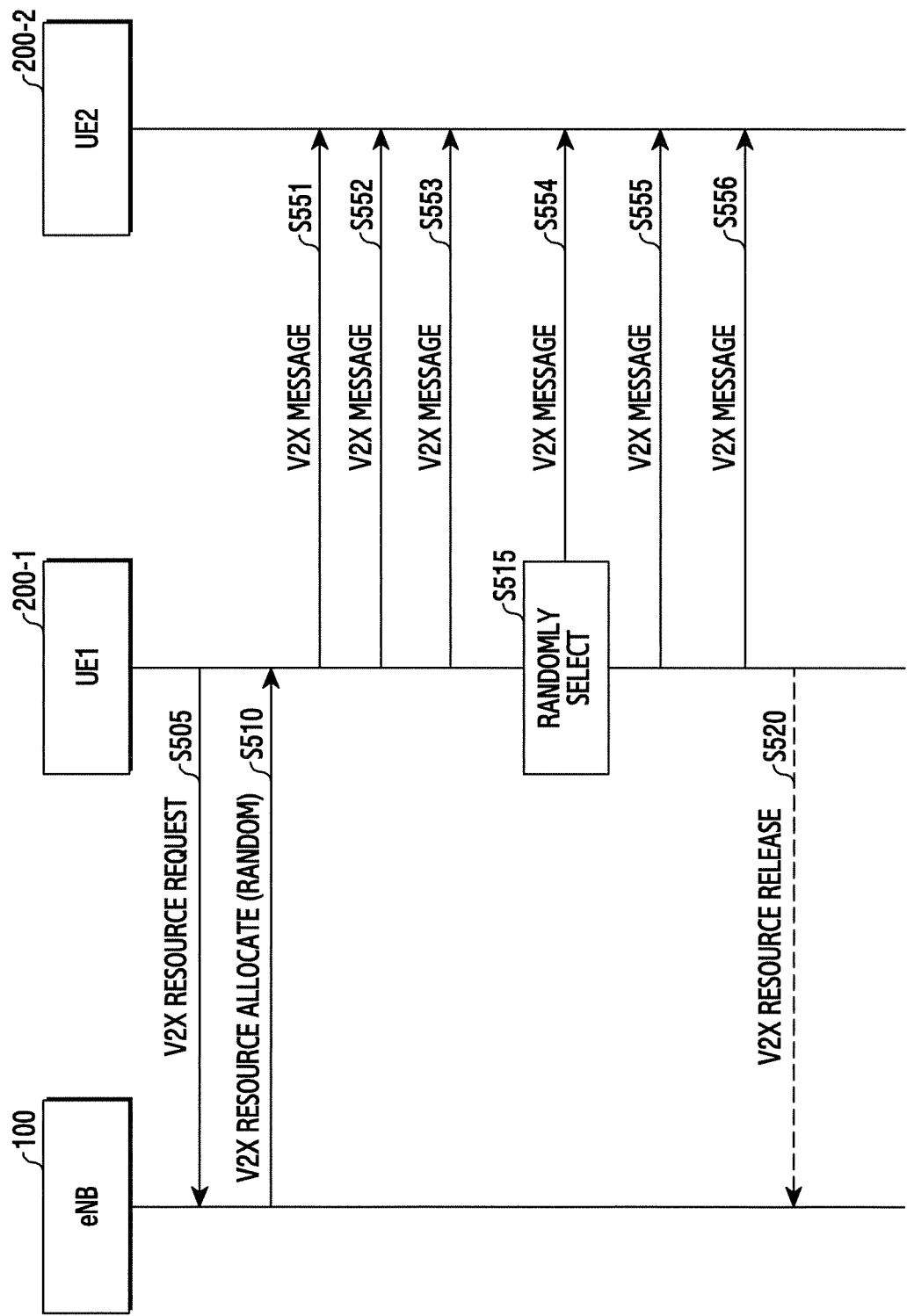

APPARATUS AND METHOD FOR ALLOCATING RESOURCE FOR VEHICLE SERVICE

CROSS-REFERENCE TO RELATED APPLICATIONS AND CLAIM OF PRIORITY

The present application claims priority under 35 U.S.C. § 365 to International Patent Application No. PCT/KR2016/004685, which was filed on May 4, 2016, entitled "DEVICE AND METHOD FOR ALLOCATING RESOURCE FOR VEHICLE SERVICE," and claims priority to Korean Patent Application 10-2015-0064741, which was filed on May 8, 2015, each of which are incorporated herein by reference into the present disclosure as if fully set forth herein.

TECHNICAL FIELD

The present invention relates to communication for a vehicle service.

BACKGROUND ART

To meet the demand for wireless data traffic having increased since deployment of 4$^{th}$ generation (4G) communication systems, efforts have been made to develop an improved 5$^{th}$ generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference maycellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In recent, communication technology is advancing to provide various services to users. For example, a vehicle communication system provides a vehicle service between a vehicle and a vehicle, between a vehicle and an infrastructure, between a vehicle and a pedestrian, between a vehicle and a driver, and between a vehicle and a passenger using a wireless communication technique. Such a vehicle service requires periodical transmission, low latency transmission, and high reliability transmission of vehicle service information.

DISCLOSURE OF INVENTION

Technical Problem

Hence, embodiments of the present invention provide an apparatus and a method for transmitting and receiving vehicle service information in a vehicle communication system.

Embodiments of the present invention provide an apparatus and a method for allocating a resource for transmitting and receiving vehicle service information in a vehicle communication system.

Embodiments of the present invention provide an apparatus and a method for allocating a resource for periodically transmitting and receiving vehicle service information without latency in a vehicle communication system.

Embodiments of the present invention provide an apparatus and a method for allocating a resource for periodically transmitting and receiving vehicle service information with reliability without latency and communication via a cellular base station in a vehicle communication system.

Solution to Problem

According to an embodiment of the present invention, a base station of a wireless communication system includes a control unit for allocating a resource for a terminal which provides a second service based on priorities of a used resource allocated for a first service and a requested resource for the second service among total preconfigured resource for a vehicle service, and a transmitter for transmitting the resource allocation information to the terminal.

According to another embodiment of the present invention, a terminal of a wireless communication system includes a receiver for receiving resource allocation information corresponding to resource request information from a base station, and a transmitter for transmitting the resource request information to the eNB, and transmitting information for a second vehicle service to other terminal using an allocated resource of the resource allocation information. The allocated resource is allocated by the eNB based on priorities of a used resource allocated for a first service and a requested resource for the second service among total preconfigured resource for a vehicle service.

According to yet another embodiment of the present invention, an operating method of a base station of a wireless communication system includes allocating a resource for a terminal which provides a second service based on priorities of a used resource allocated for a first service and a requested resource for the second service among total preconfigured resource for a vehicle service, and transmitting the resource allocation information to the terminal.

According to still another embodiment of the present invention, an operating method of a terminal of a wireless communication system includes transmitting resource request information to a base station, receiving resource allocation information corresponding to resource request information from a base station, and transmitting the resource request information to the eNB, and transmitting information for a second vehicle service to other terminal using an allocated resource of the resource allocation information. The allocated resource is allocated by the eNB based on priorities of a used resource allocated for a first service and a requested resource for the second service among total preconfigured resource for a vehicle service.

Advantageous Effects of Invention

Embodiments of the present invention may support periodic signal transmission and reception of a device supporting a vehicle service in a vehicle communication system. Also, embodiments of the present invention may provide reliability of the periodic signal transmission and reception of the device supporting the vehicle service in the vehicle communication system.

BRIEF DESCRIPTION OF DRAWINGS

For a more complete understanding of the present invention and its effects, the following description will be made with reference to the accompanying drawings, where the same reference numerals represent the same parts.

FIG. 5 is a diagram showing a procedure for processing resource allocation and vehicle service provision operations for a vehicle service according to a fourth embodiment of the present invention.

BEST MODE FOR CARRYING OUT THE INVENTION

Figure 1A:
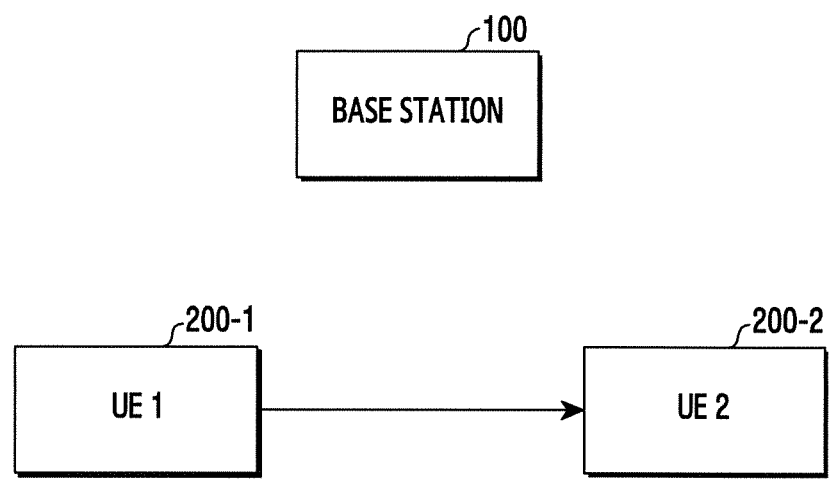
FIGS. 1A through 1C are diagrams showing examples of a vehicle service provided in a vehicle communication service to which embodiments of the present invention are applied.

Hereinafter, embodiments of the present invention will be described with reference to the accompanying drawings in detail. In the following, only essential parts necessary to understand operations according to embodiments of the present invention will be explained, and other parts will not be explained when it is deemed that they may unnecessarily obscure the subject matter of the invention. Also, terminologies to be described below are defined in consideration of functions in the embodiments of the present invention and may vary depending on a user's or an operator's intention or practice. Thus, their definitions should be defined based on all the contents of the specification.

The present invention may make various changes and have various embodiments, and particular embodiments shall be explained in detail with the drawings. However, this is not to limit the present invention to particular embodiments, and it should be understood to include all changes, equivalents, and substitutes embraced in the spirit and technical field of the present invention. Thus, FIG. 1A through FIG. 18 are merely examples used to explain principles of the present invention in the present specification, and it is not construed to restrict the range of the invention.

Embodiments of the present invention to be explained relate to a method for allocating a resource for periodically transmitting and receiving vehicle service information in a Vehicle to everything (V2X) service support vehicle or a V2X service support device in a vehicle communication (hereafter, referred to as V2X communication) system between a vehicle and a vehicle, between a vehicle and a device, or between a vehicle and an infrastructure. In particular, embodiments of the present invention relate to a method for providing the resource for transmitting and receiving the vehicle service information without latency when the V2X service support vehicle and the V2X service support device reside in cellular base station coverage.

The V2X communication system supports direct communication or communication via a cellular base station between the vehicle service support vehicle and a device such as between a vehicle and a vehicle, between a vehicle and an infrastructure, between a vehicle and a pedestrian, between a vehicle and a driver, and between a vehicle and a passenger. The vehicle service includes safety services such as incident notification, forward collision warning, emergency vehicle notification, and pedestrian warning, vehicle information services such as parking facility notification, navigation, and vehicle diagnostics, and traffic information services such as lane change notification, road use change notification, and speed limit notification. The vehicle service requires periodic transmission, low latency transmission, and high reliability transmission of vehicle service information.

Meanwhile, the vehicle service may be performed via or without a base station of a wireless communication system such as Long Term Evolution (LTE). The V2X communication system using a Device-to-Device (D2D) communication protocol (e.g., ProSe protocol) supporting direct communication between devices may provide a low-latency vehicle service, compared with a case via the cellular base station. However, when the D2D communication protocol is used, the low latency required by the vehicle service may not be satisfied. For example, when obtaining a resource for transmitting the vehicle service information, competition between vehicle service devices may cause message delay.

Figure 1B:
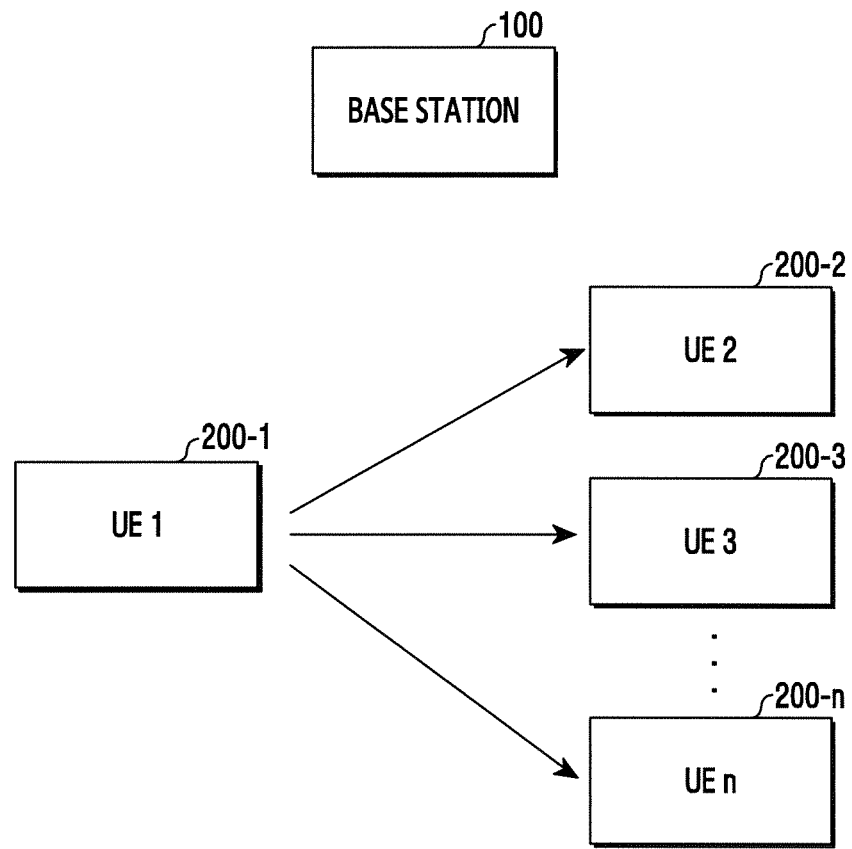
Figure 1C:
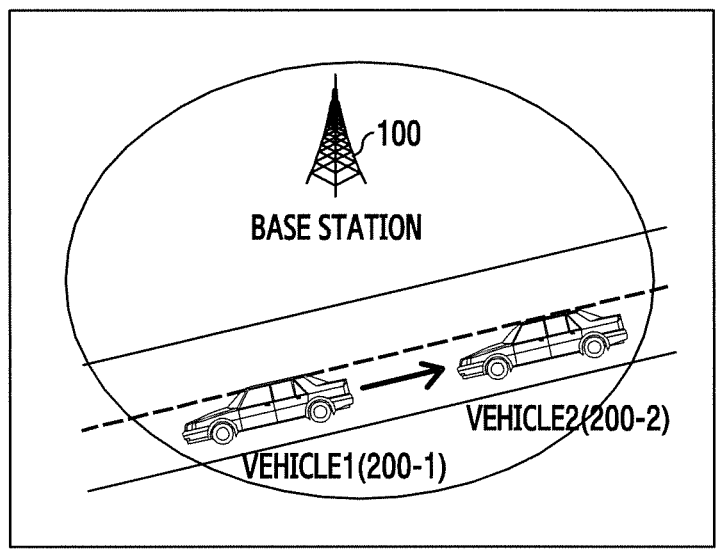

FIGS. 1A through 1C are diagrams showing examples of a vehicle service provided in a vehicle communication service to which embodiments of the present invention are applied.

Referring to FIG. 1A and FIG. 1B, the vehicle service according to embodiments of the present invention may be transmitted from a first User Equipment (UE) 200-1 to a single second UE 200-2 without passing through a cellular base station 100 (FIG. 1A), or transmitted from the first UE 200-1 to a plurality of UEs 200-1 through 200-*n* (FIG. 1B). According to an embodiment, the first UE 200-1 and the second UE 200-2 each may be a vehicle (FIG. 1C). According to another embodiment, one of the first UE 200-1 and the second UE 200-2 may be a vehicle, and the other may be a device or an infrastructure. The infrastructure may be a Road Side Unit (RSU) and may support a vehicle service according to embodiments of the present invention, to be explained. For example, the RSU may be an independent device or a device included in the base station. For example, the RSU may be a device installed or operated by a government, a traffic related institution, a provider, or a general user.

The device may be various communication devices, and may support the vehicle service according to embodiments of the present invention, to be explained. For example, the device may be a communication device of a driver in a vehicle. For example, the device may be a communication device of a passenger in a vehicle. For example, the device may be a detachable communication device in a vehicle. For example, the device may be a communication device of a pedestrian. For example, the device may be a communication device of a motorcycle driver or a communication device of a bicycle driver. For example, the device may be a communication device of a stroller driver or a communication device of a motorcycle driver.

The communication device may be electronic devices of various types. According to various embodiments of the present invention, the electronic device may include a communication function. For example, the electronic device may be a smart phone, a tablet Personal Computer (PC), a mobile phone, a video phone, an e-book reader, a desktop PC, a laptop PC, a netbook PC, a Personal Digital Assistant (PDA), a Portable Multimedia Player (PMP), an MP3 layer, a mobile medical device, a camera, or a wearable device (e.g., a Head-Mounted Device (HMD), an electronic garment, an electronic bracelet, an electronic necklace, an electronic appcessory, an electronic tattoo, or a smart watch).

According to various embodiments of the present invention, the electronic device may be a smart home appliance having the communication function. For example, the smart home appliance may include a television, a Digital Video Disk (DVD) player, an audio device, a refrigerator, an air-conditioner, a vacuum cleaner, an oven, a microwave oven, a washer, a drier, an air cleaner, a set-top box, a TV box (e.g., Samsung HomeSync™ Apple TV™, or Google TV™), a gaming console, an electronic dictionary, a camcorder, and an electronic frame.

According to various embodiments of the present invention, the electronic device may be a medical device, a navigation device, a Global Positioning System (GPS) receiver, an Event Data Recorder (EDR), a Flight Data Recorder (FDR), a vehicle infotainment device, electronic device for ship, avionics, a security device, an industrial or home robot, an detachable device in a vehicle, and an unremovable device in a vehicle. For example, the medical device may be a Magnetic Resonance Angiography (MRA) device, a Magnetic Resonance Imaging (MRI) device, a Computed Tomography (CT) device, a smayning machine, or an ultrasonic wave device. For example, the electronic device for ship may be a navigation device for ship, a gyroscope, or a compass.

According to various embodiments of the present invention, the electronic device may be a furniture, part of a building/construction, an electronic board, an electronic signature receiving device, a projector, and various measuring devices (e.g., water supply, electricity, gas, or electric wave measuring device), including the communication function.

According to various embodiments of the present invention, the electronic device may be a combination of the devices as described above. Also, those skilled in the art will appreciate that the electronic device according to preferred embodiments of the present invention is not limited to the above-stated devices.

According to various embodiments of the present invention, the UE may be, for example, an electronic device.

Also, according to various embodiments of the present invention, for example, the UE may operate as a signal transmitting device and a signal receiving device.

Referring to FIG. 1C, the first vehicle 200-1 and the second vehicle 200-2 receive a communication service within service coverage of the cellular base station 100. The first vehicle 200-1 and the second vehicle 200-2 support a direct communication scheme between a vehicle and a vehicle, between a vehicle and a device, or between a vehicle and an infrastructure according to embodiments of the present invention. The first vehicle 200-1 and the second vehicle 200-2 periodically or aperiodically transmit vehicle service information which generates when a particular vehicle service event occurs, when locating in a particular region, or when using the vehicle service. As shown, the first vehicle 200-1 may transmit the vehicle service information to the second vehicle 200-2, and the vehicle service information may be transmitted periodically. For example, when the first vehicle 200-1 makes an emergency stop on a road, the first vehicle 200-1 may send its emergency stop state message to a vehicle approaching from behind or a vehicle around it, and the emergency stop state message may be periodically transmitted.

Embodiments of the present invention to be described provide an apparatus and method for periodically transmitting and receiving vehicle service messages in a V2X communication system. In addition, embodiments of the present invention provide an apparatus and method for transmitting and receiving vehicle service messages with low latency and high reliability in a V2X communication system.

Figure 13:
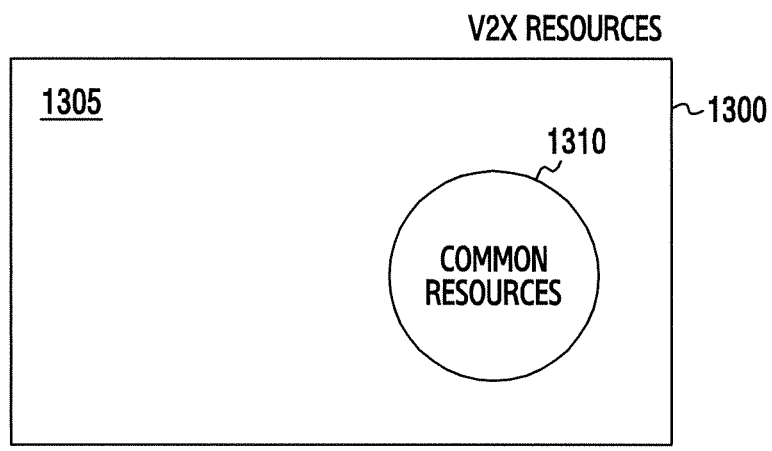
FIG. 13 is a diagram showing an example of resource configuration for service vehicle provision according to an embodiment of the present invention.

V2X resources used to transmit and receive the vehicle service messages in the V2X communication system according to embodiments of the present invention are managed as separate V2X communication resources 1300 as shown in FIG. 13. The V2x resources 1300 include resources 1305 which may be allocated for vehicle services in response to a resource request from a UE for various vehicle services. Also, the V2x resources 1300 include common resources 1310 commonly allocated for the vehicle services. The common resources 1310 may be allocated to be used randomly with a certain probability value. The V2x resource 1305 or the common resource 1310 may be allocated based on a priority of the vehicle service.

In an embodiment, the V2x resources 1305 may be allocated for a vehicle service of a relatively high priority, and the common resources 1310 may be allocated for a vehicle service of a relatively low priority.

In another embodiment, when the V2x resources 1305 may be allocated for a resource allocation request for a plurality of vehicle services, that is, when there are available resources, the V2x resources 1305 may be allocated for every vehicle service.

In yet another embodiment, when the V2x resources 1305 may be allocated for a resource allocation request for a plurality of vehicle services, that is, when there are no available resources, the V2x resources 1305 may be allocated for a second vehicle service of a higher priority than a priority of a first vehicle service allocated to an existing resource. In this case, the V2x resources 1305 for the first vehicle service may be withdrawn, and the common resources 1310 may be allocated to be used with a particular probability value for the first vehicle service.

In still another embodiment, when the V2x resources 1305 may not be allocated for a resource allocation request for a plurality of vehicle services, that is, when there are no available resources, the common resources 1310 may be allocated for a second vehicle service of a lower priority than a priority of a first vehicle service allocated to an existing resource. When the common resources 1310 are allocated for the first vehicle service to be used with a first particular probability value, the common resources 1310 may be allocated for the second vehicle service to be used with a second particular probability value which is lower than a first particular probability value.

The V2X resources 1300 used to send and receive the vehicle service message may be operated globally, per provider, per Access Point Name (APN), or per base station. The resources may be used to send and receive a periodic V2X service message or an aperiodic V2X service message. A resource allocation cycle for the periodic V2X service message transmission and reception may be operated globally, per provider, per APN, or per base station.

In an embodiment, the resources used to transmit and receive the V2X service message and the resource allocation cycle may be preconfigured resources. In another embodiment, the resources used to transmit and receive the V2X service message and the resource allocation cycle may be resources given as a system information message (e.g., System Information Block (SIB)) transmitted from a base station. In yet another embodiment, the resource used to transmit the V2X service message may be preconfigured and the resource used to receive the V2X service message may be informed by the base station using a separate signal (e.g., a Radio Resource Control (RRC) message or an SIB message). In still another embodiment, the resource used to send the V2X service message may be informed by the base station using a separate signal (e.g., an RRC message or an SIB message), and the resource used to receive the V2X service message may be preconfigured.

In an embodiment, the resources used to send and receive the V2X service message may be kept for the V2X service regardless of their use. In another embodiment, the resources used to send and receive the V2X service message may releases the V2X service use when there is no device using the V2X service. In this case, the V2X resource is allocated when a device using the V2X service is registered or a device supporting the V2X service requests. When the allocated V2X resource is not needed any more, the UE may request the V2X resource release. In yet another embodiment, the allocation and the release of the resources used to send and receive the V2X service message may be operated per provider or per APN. In still another embodiment, it is noted that, when determining that the V2X resource is not used for a certain time, the base station may release the V2X resource without the UE's request.

Hereafter, a resource allocation method for periodic transmission and reception of a vehicle service message in a V2X communication system according to various embodiments of the present invention is described by referring to FIG. 2 through FIG. 8. In the following explanations, a UE may be a vehicle, a communication device in a vehicle, a user communication device, or an infrastructure (RSU), and indicates a device capable of conducting direct V2X communication without going through a cellular base station.

Figure 2:
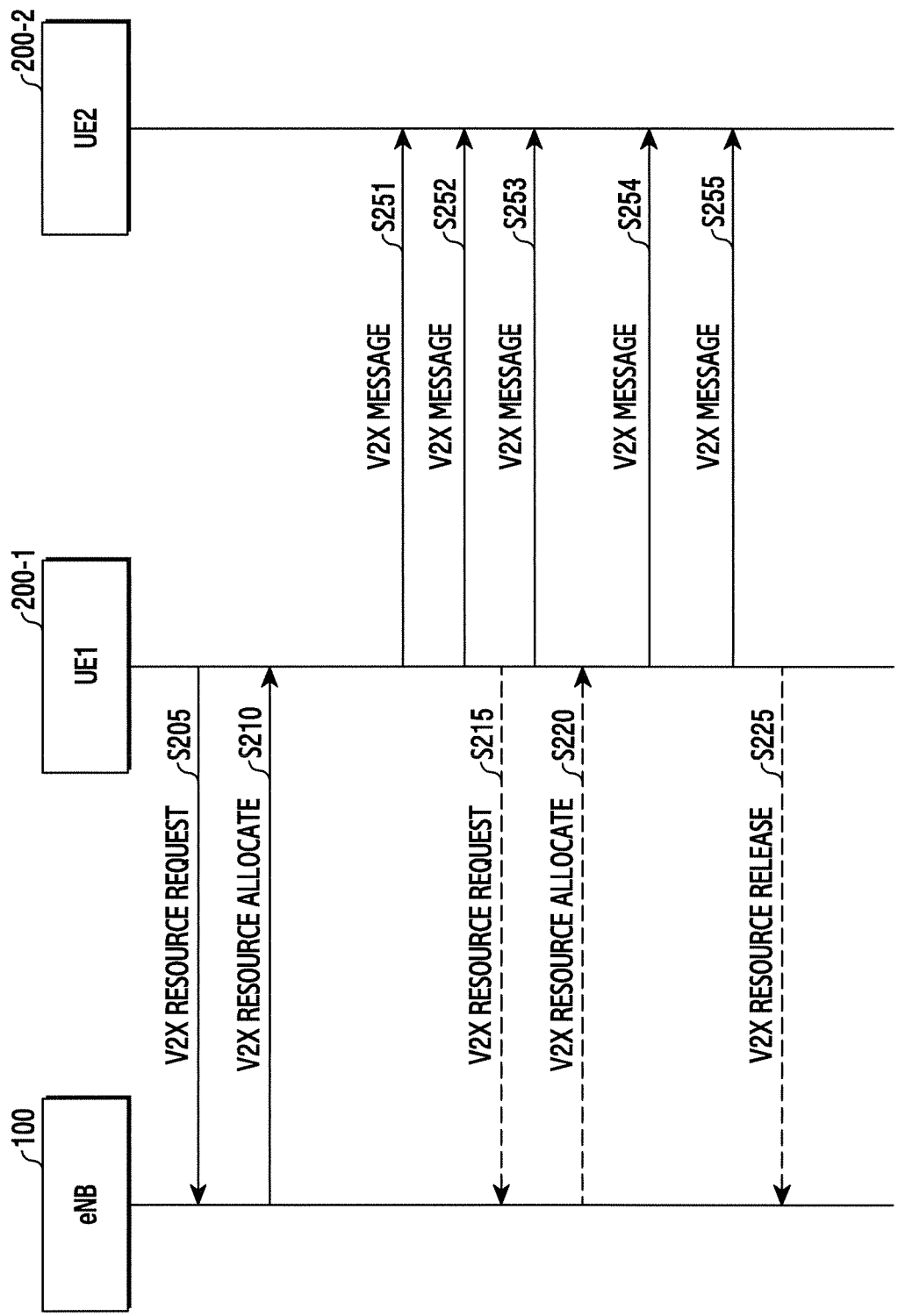
FIG. 2 is a diagram showing a procedure for processing resource allocation and vehicle service provision operations for a vehicle service according to a first embodiment of the present invention.

FIG. 2 is a diagram showing a processing procedure of resource allocation and vehicle service provision operations for a vehicle service according to a first embodiment of the present invention. This procedure is an embodiment for allocating a resource used to send and a V2X service message to a base station 100.

Figure 14:
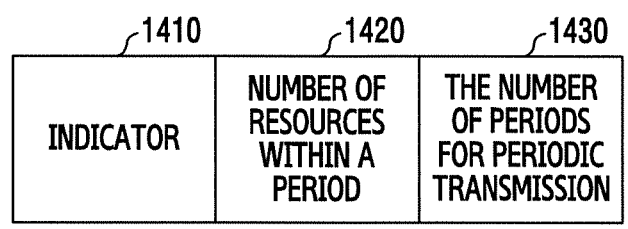
FIG. 14 is a diagram showing configuration of resource request information according to an embodiment of the present invention.

Referring to FIG. 2, when it is necessary to send a periodic V2X service message, a UE1 200-1 requests a resource required to send the periodic V2X service message from the eNB 100 (S205). Resource request information or message transmitted from the UE1 200-1 to the eNB 100 may include at least one of an indicator 1410 indicating the periodic V2X service message transmission, the number of resources within a period 1420, and the number of periods for periodic transmission 1430 as shown in FIG. 14.

Figure 15A:
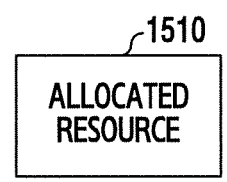
FIG. 15A is a diagram showing configuration of resource allocation information according to an embodiment of the present invention.

The base station 100 allocates the V2X service message transmission/reception resource based on the request of the UE1 200-1 and sends resource allocation information to the UE1 200-1 (S210). The resource allocation information or message may include allocated resource information 1510 as shown in FIG. 15A.

The UE1 200-1 periodically sends the V2X service message to a UE2 200-2 using the resource allocated by the base station 100 (S251, S252, and S253). The UE2 200-2 receives the V2X service message transmitted by the UE1 200-1. In an embodiment, the resource for the UE2 200-2 to receive the V2X service message is allocated by the base station 100, and identified based on a message sent from the base station 100. In another embodiment, the resource for the UE2 200-2 to receive the V2X service message may be a preconfigured resource.

When finishing the transmission of the periodic V2X service message, the UE1 200-1 may send a resource release message indicating that the allocated resource is not needed, to the base station 100 (S225). In another embodiment, after the V2X service message transmission cycle ends, the base station 100 releases the allocated resource. When the V2X service message transmission ends, the base station 100 may send a message notifying the V2X service message reception termination to the UE2 200-2.

In order to send the periodic V2X service message longer than the initially defined transmission cycle, the UE1 200-1 sends a resource request message requesting to extend the V2X cycle to the base station 100 (S215). The resource request message of the V2X cycle extension may include at least one of the indicator 1410 indicating the periodic V2X service message cycle extension, the number of resources within a period 1420, and the number of periods for periodic transmission 1430 as shown in FIG. 14.

The base station 100 receives the resource request message of the cycle extension, allocates a resource, and sends resource allocation information to the UE1 200-1 (S220). In response to the resource request message of the cycle extension, the base station 100 may direct the UE1 200-1 to keep using the same resource, or newly allocate and inform of a resource different from the previously allocated resource. The response message includes at least one of a same resource use indicator, a new resource allocation indicator, and a resource allocation extension reject indicator.

The UE1 200-1 sends a V2X service message to the UE2 200-2 through the existing resource or the newly allocated resource during the extended cycle (S254 and S255).

The base station 100 may also allocate a resource of the UE2 200-2 for the reception with the same resource as the previously allocated resource or a new resource during the extended cycle. In another embodiment, the resource for the UE2 200-2 to use in the reception may be a preconfigured resource.

The UE1 200-1, upon finishing the V2X service message transmission in the extended cycle, sends a message notifying message transmission abort and resource release to the base station 100 (S225). When the V2X service message transmission ends, the base station 100 may send a message notifying the V2X service message reception end to the UE2 200-2.

Figure 3:
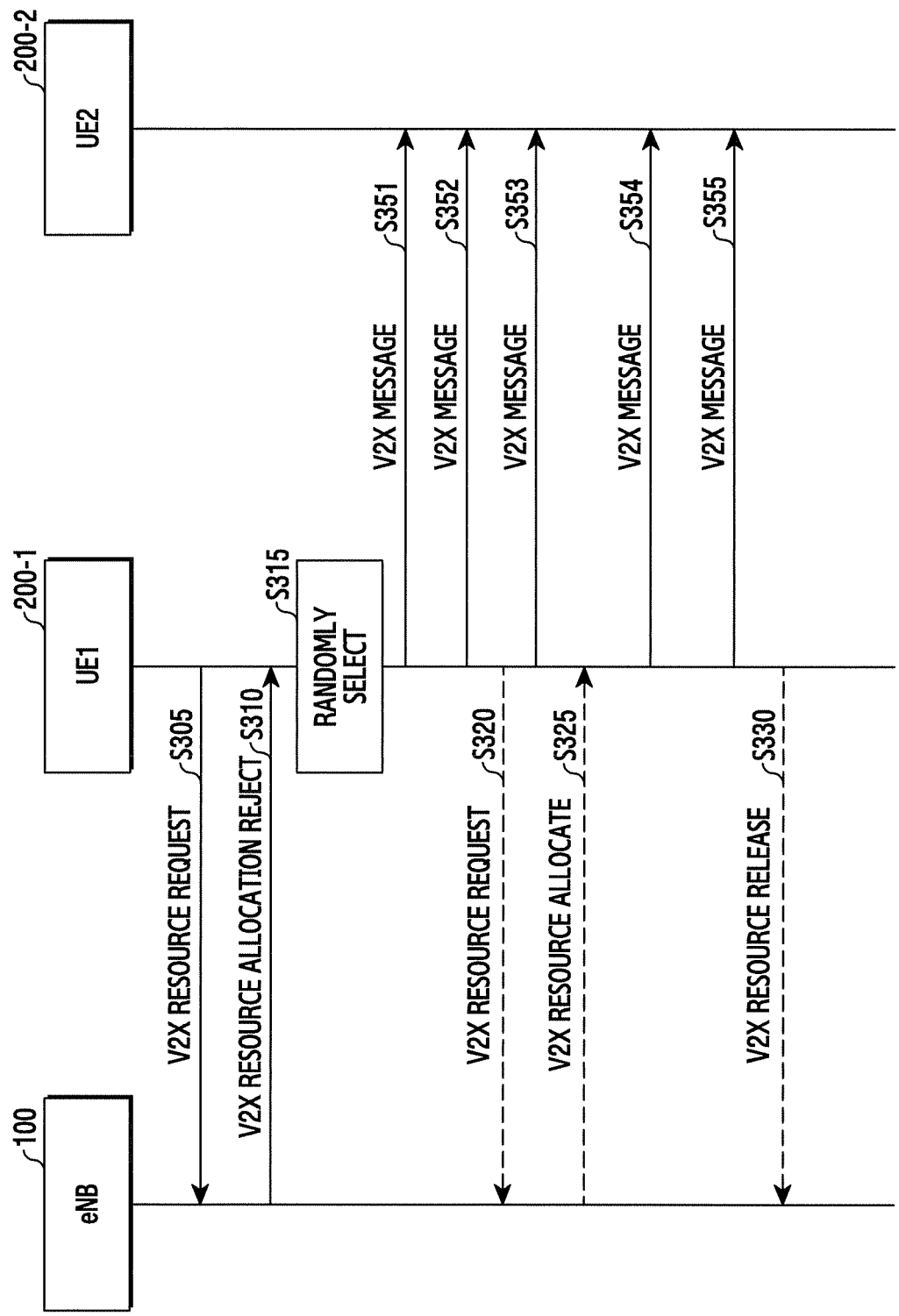
FIG. 3 is a diagram showing a procedure for processing resource allocation and vehicle service provision operations for a vehicle service according to a second embodiment of the present invention.

FIG. 3 is a diagram showing a procedure for processing resource allocation and vehicle service provision operations for a vehicle service according to a second embodiment of the present invention. This embodiment corresponds to a method for randomly selecting a periodic V2X service message transmission/reception resource in a device.

Referring to FIG. 3, when it is necessary to send a periodic V2X service message, a UE1 200-1 requests a resource required to send the periodic V2X service message from a base station 100 (S305). Resource request information or message transmitted from the UE1 200-1 to the base station 100 may include at least one of the indicator 1410 indicating the periodic V2X service message transmission, the number of resources within a period 1420, and the number of periods for periodic transmission 1430 as shown in FIG. 14.

Figure 15B:
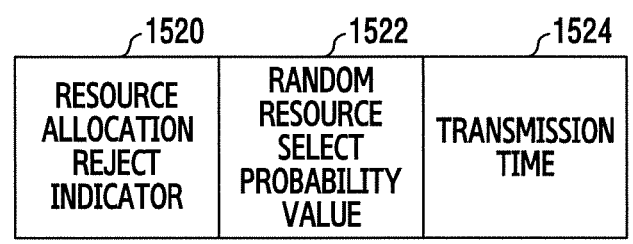
FIG. 15B is a diagram showing configuration of resource allocation information according to another embodiment of the present invention.

When not accepting the request of the UE1 200-1, the base station 100 sends resource allocation information indicating the resource request reject to the UE1 (S310). Such resource allocation information may include at least one of a resource allocation reject indicator 1520, an random resource select probability value 1522, and a transmission time 1524 for applying the arbitrary resource select probability value as shown in FIG. 15B. The arbitrary resource select probability value may be determined based on a V2X service priority or a V2X application priority.

An example where the base station 100 rejects the periodic V2X service message transmission resource allocation request of the device (e.g., the UE1 200-1) is a case where the V2X service resource is allocated to a V2X application of a higher priority than a V2X application of the device.

The UE1 200-1 selects a resource for sending the periodic V2X service message by applying the arbitrary resource select probability value directed by the base station 100 (S315). The resource is, for example, the common resource 1310 of FIG. 13 allocated to send a normal periodic V2X service message. The UE1 200-1 periodically sends the V2X service message to the UE2 200-2 using the selected resource (S351 and S352).

When the base station 100 directs the transmission cycle to apply the arbitrary resource select probability value, the UE1 200-1 sends a V2X service message over the selected resource during the transmission cycle directed by the base station 100. The UE2 200-2 may receive the V2X service message over the resource indicated by the base station 100 or receive the V2X service message over a preconfigured resource. Upon finishing the periodic V2X service message transmission, the UE1 200-1 may notify the transmission end to the base station 100 (S330). By reflecting the resource released by the UE1 200-1, the base station 100 may adjust the arbitrary resource select probability value and the transmission time for allocating resources to other UEs.

When the UE1 200-1 still has a V2X service message to periodically send even after the transmission cycle indicated by the base station 100 expires, the UE1 200-1 sends a resource request message for requesting transmission cycle extension to the base station 100 (S320). In an embodiment, the base station 100 receiving the transmission cycle extension request may separately allocate a resource to the UE1 200-1 (S325). In another embodiment, the base station 100 may provide the arbitrary resource select probability value and the transmission time to the UE1 200-1 and direct to select an arbitrary resource (S325).

The UE2 200-1 sends a periodic V2X service message to the UE2 200-2 using the allocated resource or selecting the arbitrary resource as directed by the base station 100 (S354 and S355). When finishing the periodic V2X service message transmission, the UE1 200-1 may send a resource release or transmission complete message to the base station 100 (S330). When the transmission cycle is extended, the resource for the UE2 200-2 to receive the periodic V2X message may be separately indicated by the base station 100 or preconfigured.

The procedures for processing the resource allocation of FIG. 2 and FIG. 3 exemplify only the case where the single device UE1 200-1 requests the resource allocation. When resource allocations from a plurality of devices contend, the resource allocation may differ based on the priority of the V2X service or the V2X application to be provided by a corresponding device.

Hereafter, examples for using a radio resource based on the priority of the V2X application are described. The V2X application may include, for example, a safety service, a traffic flow control service, and a traffic convenience service as shown in Table 1.

TABLE 1

| V2X application (service) | Priority | Example |
| --- | --- | --- |
| safety service | 1 | collision warning<br>forward collision warning |
| traffic flow control service | 2 | curved load speed limit warning<br>traffic flow warning |
| traffic convenience service | 3 | parking space alram |

The safety service may have a relatively high priority requiring low latency and high reliability compared with the traffic flow control service and the traffic convenience service. The traffic flow control service may have a relatively high priority requiring low latency and high reliability compared with the traffic convenience service. Among V2X applications classified to the safety service, latency time (e.g., 20 msec) required by the collision warning may be lower than latency time (e.g., 100 msec) required by the forward collision warning. Among V2X applications classified to the traffic flow control service, latency time (e.g., 500 msec) required by the curved load speed limit warning may be lower than latency time (e.g., 1 sec) required by the traffic flow warning. When the required latency is low even in the same V2X service group, a high priority may be set.

(Case 1)

It is assumed that a device A detects a forward collision possibility and requests a resource for sending a forward collision warning message from a base station. The base station allocates a resource allowing the device A to periodically send the forward collision message. While the device A sends the forward collision warning message, a device B requests a resource for periodically sending a speed limit warning message from the base station.

The base station determines whether to support the resource requests of the device A and the device B together. When not supporting the resource requests of the device A and the device B together according to a determination, the base station compares the priority of the latency time of the forward collision warning service and the speed limit warning service. The base station supports resource allocation such that the device A of the high priority may periodically send the forward collision warning message. Also, the base station instructs the preconfigured resource use, the arbitrary resource select probability value, and the transmission time for applying the arbitrary resource select probability value to the device B so that the device B of the low priority may periodically send the speed limit warning message.

The device B periodically sends the speed limit warning message by selecting the preconfigured resource with the arbitrary resource select probability value as instructed by the base station.

An example of the resource allocation according to the above-stated Case 1 is shown in Table 2.

TABLE 2

| Section | Device A | Device B |
| --- | --- | --- |
| Service Priority | H | L |
| Resource Allocation | Dedicated resource | Dedicated resource →<br>Common resource (random<br>resource select probability<br>value) |

(Case 2)

It is assumed that the device A is allocated a resource from the base station to periodically send a V2X service message indicating traffic flow warning, and periodically sends a traffic flow warning message using the resource. While the device A sends the traffic flow warning message, the device B detects a forward collision possibility and requests a resource for sending a forward collision warning message from the base station.

When the device A and the device B are limited in resource use to periodically send the V2X service message, the base station determines to utilize a resource of the device A of the low priority for the V2X service message transmission of the device B. Herein, the priority is assumed to be the low latency time. The base station instructs the preconfigured resource use, the arbitrary resource select probability value, and the transmission time for applying the arbitrary resource select probability value to the device A.

The device A selects the preconfigured resource newly indicated by the base station, rather than the resource allocated from the base station, by applying the arbitrary resource select probability value, and periodically sends the traffic flow warning message.

The base station allocates a resource for periodically sending the forward collision warning message to the device B.

An example of the resource allocation according to the above-stated Case 2 is shown in Table 3.

TABLE 3

| Section | Device A | Device B |
| --- | --- | --- |
| Service Priority | L | H |
| Resource Allocation | Dedicated resource →<br>Common resource (random<br>resource select probability<br>value) | Dedicated resource |

(Case 3)

It is assumed that the device A is periodically sending a V2X service message indicating traffic flow warning with the arbitrary resource select probability value a over a preconfigured resource. Also, it is assumed that the device B is periodically sending a V2X service message indicating a forward collision warning over a resource allocated from the base station.

While the device A and the device B send the V2X service message, a device C sends a resource request for sending a curved road speed limit warning message, to the base station.

When the base station determines that a V2X service priority of the device C is the lowest and determines no resource allocation, the base station instructs the preconfigured resource use, the arbitrary resource select probability value, and the transmission time for applying the arbitrary resource select probability value to the device C. In so doing, since the device A is already using the preconfigured resource and the V2X service priority of the device C is lower than the V2X service priority of the device A, the base station sets the random resource select probability value to be used by the device C for the resource selection, to a value b which is lower than a.

The device C selects the preconfigured resource by applying the random resource select probability value as instructed by the base station, and periodically sends the curved road speed limit warning message.

An example of the resource allocation according to the above-stated Case 3 is shown in Table 4.

TABLE 4

| Section | Device A | Device B | Device C |
|---|---|---|---|
| Service Priority | 2 | 1 | 3 |
| Resource Allocation | Common resource (probability value a) | Dedicated resource | Common resource (probability value b) |

Figure 4:
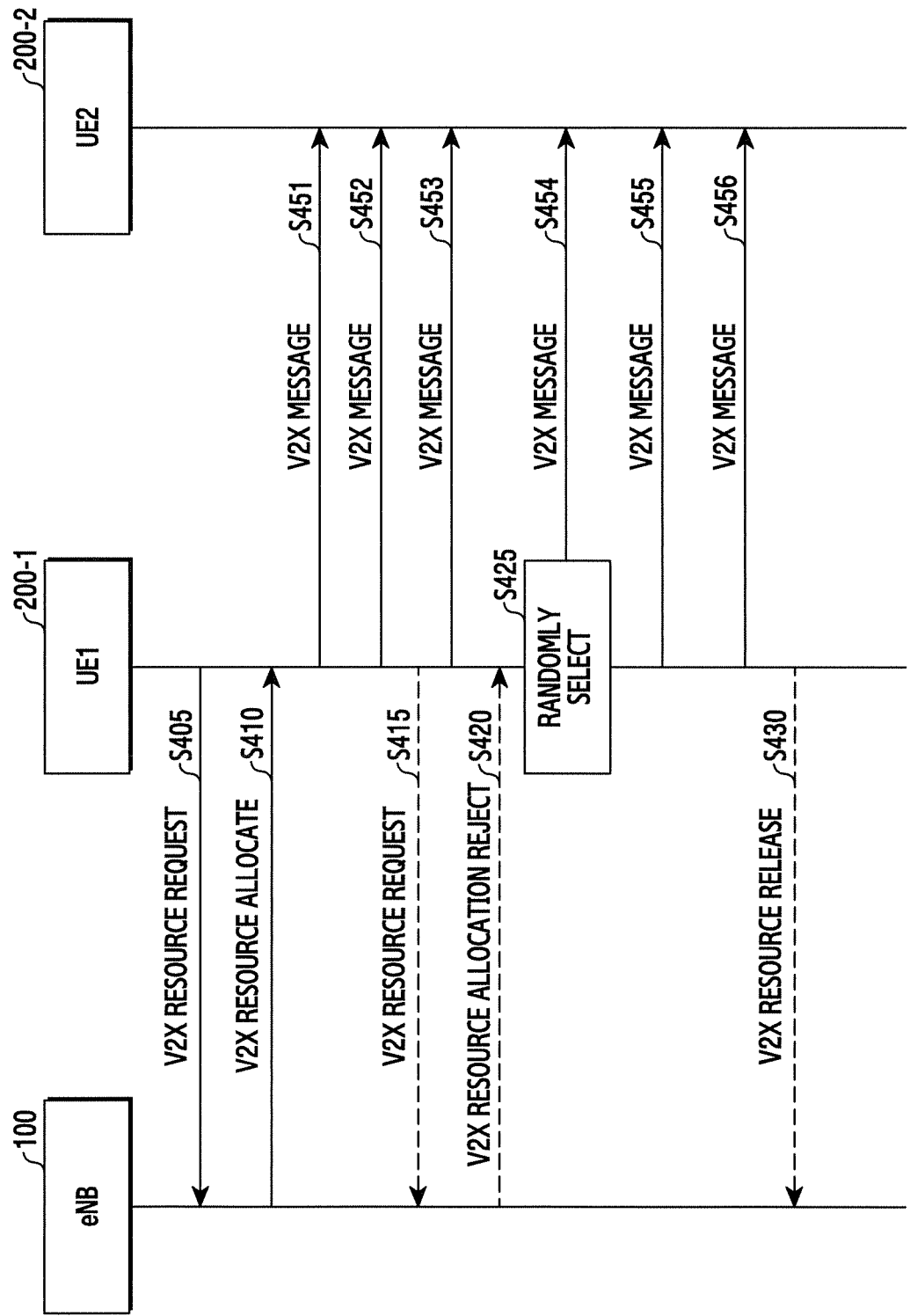
FIG. 4 is a diagram showing a procedure for processing resource allocation and vehicle service provision operations for a vehicle service according to a third embodiment of the present invention.

FIG. 4 is a diagram showing a procedure for processing resource allocation and vehicle service provision operations for a vehicle service according to a third embodiment of the present invention. This embodiment corresponds to a method for initially allocating a periodic V2X service message transmission/reception resource from a base station and randomly selecting a resource in a device when the periodic V2X service message transmission is extended.

Referring to FIG. 4, when it is necessary to send a periodic V2X service message, a UE1 200-1 requests a resource required to send the periodic V2X service message from a base station 100 (S405). A resource request message transmitted from the UE1 200-1 to the base station may include at least one of the indicator 1410 indicating the periodic V2X service message transmission, the number of resources within a period 1420, and the number of periods for periodic transmission 1430 as shown in FIG. 14.

The base station 100 allocates a V2X service message transmission/reception resource by reflecting the request of the UE1 200-1 and sends resource allocation information to the UE1 200-1 (S410). The resource allocation information or message may include the allocated resource information 1510 as shown in FIG. 15A.

The UE1 200-1 periodically sends the V2X service message to a UE2 200-2 using the resource allocated by the base station 100 (S451, S452, and S453). The UE2 200-2 receives the V2X service message transmitted by the UE1 200-1. In an embodiment, the resource for the UE2 200-2 to receive the V2X service message is allocated by the base station 100, and may be identified from a message sent from the base station 100. In another embodiment, the resource for the UE2 200-2 to receive the V2X service message may be a preconfigured resource.

When finishing the periodic V2X service message transmission, the UE1 200-1 may send a resource release message indicating that the allocated resource is not needed, to the base station 100 (S430). In another embodiment, after the V2X service message transmission cycle ends, the base station 100 releases the allocated resource. When the V2X service message transmission ends, the base station 100 may send a message notifying the V2X service message reception end to the UE2 200-2.

To send the periodic V2X service message longer than the initially defined transmission cycle, the UE1 200-1 sends a resource request message requesting to extend the V2X cycle to the base station 100 (S415). The resource request message of the V2X cycle extension may include at least one of the indicator 1410 indicating the periodic V2X service message cycle extension, the number of resources within a period 1420, and the number of periods for periodic transmission 1430 as shown in FIG. 14.

When not extending the resource allocation for the periodic V2X service message transmission to the UE1 200-1, the base station 100 sends resource allocation information indicating the resource request reject to the UE1 (S420). Such resource allocation information may include at least one of the resource allocation extension reject indicator 1520, the random resource select probability value 1522, and the transmission time 1524 for applying the random resource select probability value as shown in FIG. 15B. The random resource select probability value may be determined based on the V2X service priority or the V2X application priority.

The UE1 200-1 selects a resource for sending the periodic V2X service message by applying the random resource select probability value directed by the base station 100 (S425). The resource is, for example, the common resource 1310 of FIG. 13 allocated to send a normal periodic V2X service message. The UE1 200-1 periodically sends the V2X service message to the UE2 200-2 using the selected resource (S454, S455, and S456).

When the base station 100 directs the transmission cycle to apply the random resource select probability value, the UE1 200-1 sends a V2X service message over the selected resource during the transmission cycle indicated by the base station 100. The UE2 200-2 may receive the V2X service message over the resource indicated by the base station 100 or receive the V2X service message over a preconfigured resource. Upon finishing the periodic V2X service message transmission, the UE1 200-1 may notify the transmission end to the base station 100 (S430). By reflecting the resource released by the UE1 200-1, the base station 100 may adjust the random resource select probability value and the transmission time for allocating resources to other UEs.

FIG. 5 is a diagram showing a procedure for processing resource allocation and vehicle service provision operations for a vehicle service according to a fourth embodiment of the present invention. This embodiment corresponds to a method for, when a periodic V2X service message transmission/reception resource is allocated, allowing a base station to allocate part of a transmission cycle and a device to arbitrarily selecting part.

Referring to FIG. 5, when it is necessary to send a periodic V2X service message, a UE1 200-1 requests a resource required to send the periodic V2X service message from a base station 100 (S505). A resource request message transmitted from the UE1 200-1 to the base station 100 may include at least one of the indicator 1410 indicating the periodic V2X service message transmission, the number of resources within a period 1420, and the number of periods for periodic transmission 1430 as shown in FIG. 14.

Figure 15C:
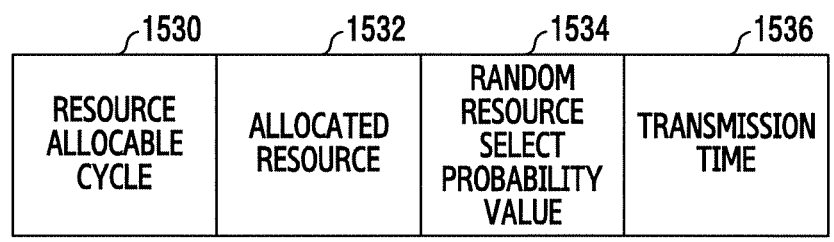
FIG. 15C is a diagram showing configuration of resource allocation information according to yet another embodiment of the present invention.

The base station 100 determines whether the periodic V2X service message transmission/reception resource may be allocated by reflecting the request of the UE1 200-1. When not allocating a resource to satisfy the message transmission cycle requested by the UE1 200-1 according to the determination, the base station 100 determines whether a resource may be allocated during partial time of the message transmission cycle requested by the UE1 200-1. When the resource may be allocated during partial time of the message transmission cycle requested by the UE1 200-1, the base station 100 allocates the resource and sends resource allocation information to the UE1 200-1 (S510). The resource allocation information or message may include at least one of a resource allocable cycle 1530, an allocated resource 1530, an random resource select probability value 1534 to use in a cycle when the resource allocation is not feasible, and a transmission time 1534 for applying the random resource select probability value as shown in FIG. 15C.

When not supporting the resource allocation during the transmission cycle requested by the UE1 200-1, the base station 100 sends a message including at least one of the random resource select probability value and the transmission time for applying the random resource select probability value, to the UE1 200-1.

The UE1 200-1 selects the resource as instructed by the base station 100 and sends a periodic V2X service message to the UE2 200 (S551, S552, and S553). The UE2 200-2 receives the V2X service message transmitted by the UE1 200-1. In an embodiment, the resource for the UE2 200-2 to receive the V2X service message is allocated by the base station 100, and may be identified from a message sent from the base station 100. In another embodiment, the resource for the UE2 200-2 to receive the V2X service message may be a preconfigured resource.

When finishing the periodic V2X service message transmission, the UE1 200-1 may send a resource release message indicating that the allocated resource is not needed, to the base station 100 (S520). In another embodiment, after the V2X service message transmission cycle ends, the base station 100 releases the allocated resource. When the periodic V2X service message transmission ends, the base station 100 may send a message notifying the V2X service message reception end to the UE2 200-2.

In order to extend the periodic V2X service message transmission cycle, the UE1 200-1 may notify the periodic V2X service message transmission extension to the base station 100 and request a necessary resource. A response of the base station 100 for the periodic V2X service message transmission extension request of the UE1 200-1 may include rejection, allocation, or random resource select indication as described in the above embodiments.

Figure 6A:
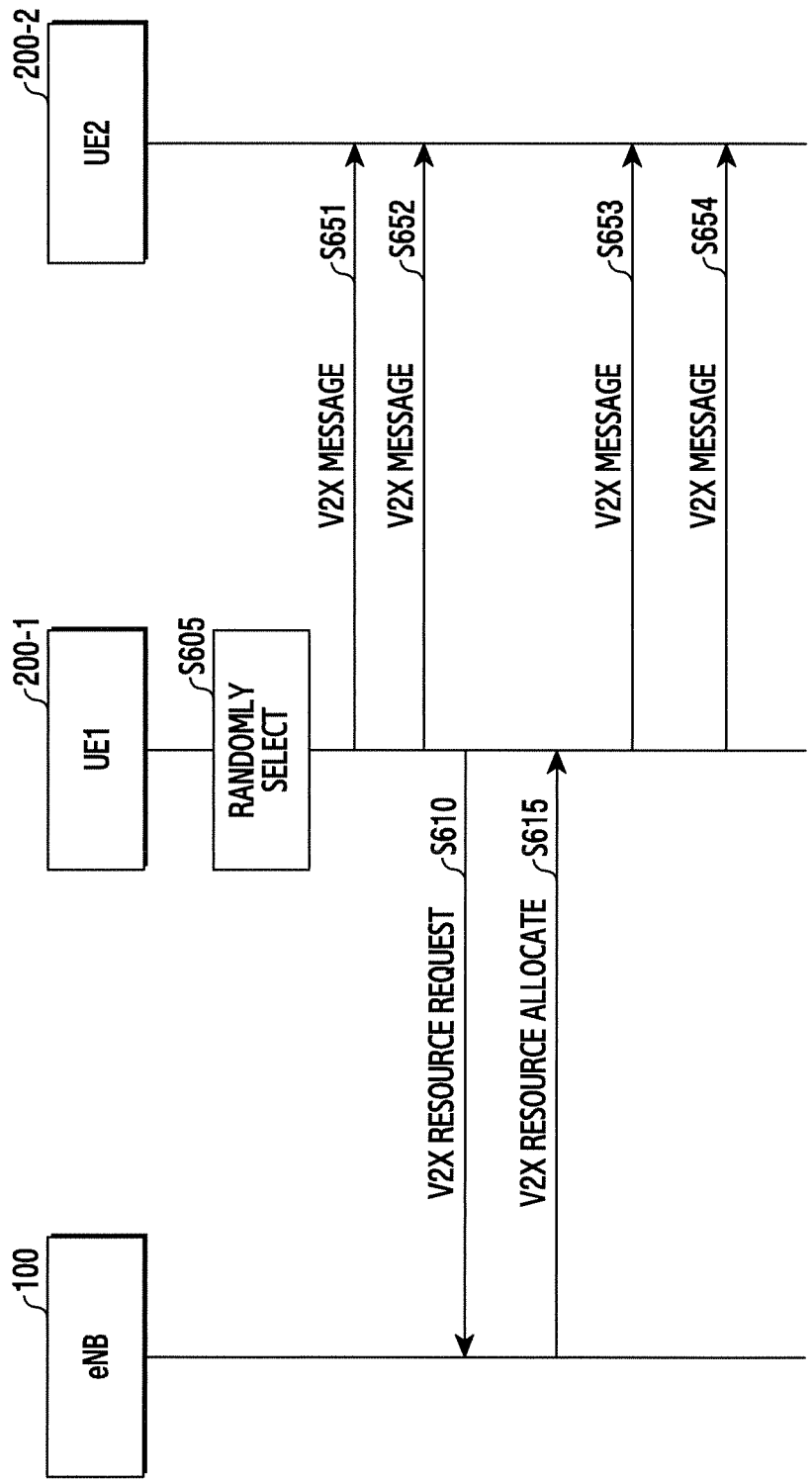
FIGS. 6A and 6B are diagrams showing a procedure for processing resource allocation and vehicle service provision operations for a vehicle service according to a fifth embodiment of the present invention.
Figure 6B:
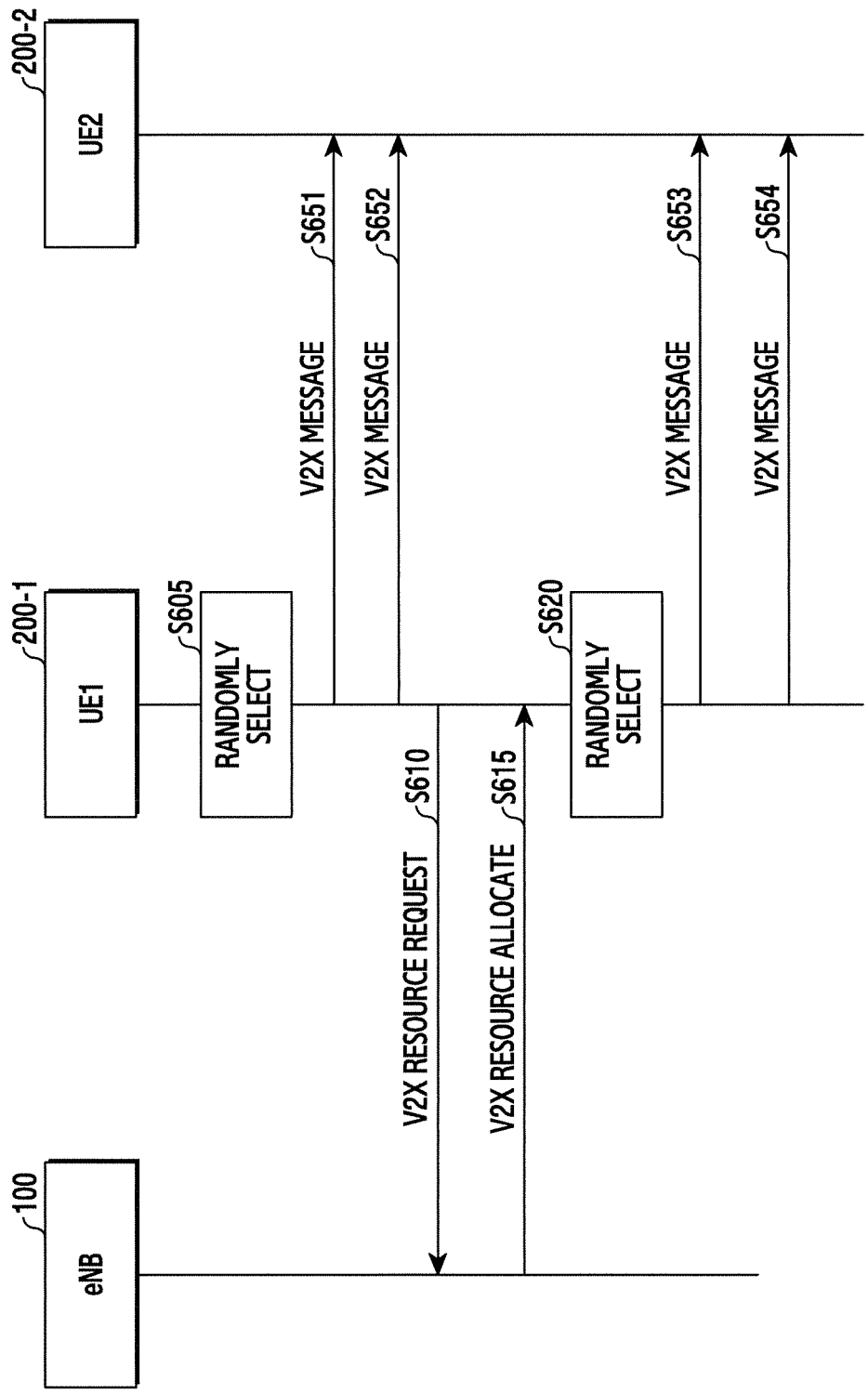

FIGS. 6A and 6B are diagrams showing procedures for processing resource allocation and vehicle service provision operations for a vehicle service according to a fifth embodiment of the present invention. These embodiments correspond to a case where a device UE1 200-1 for sending a periodic V2X service message sends the periodic V2X service message (S605, S651, and S652 of FIG. 6A and FIG. 6B) by arbitrarily selecting a resource from a preconfigured V2X service message transmit resource, and requests periodic V2X service message resource allocation from a base station 100 (S610 and S615). In one embodiment, when arbitrarily selecting the resource, the device UE1 200-1 may use the highest probability value as an random resource select probability value. In another embodiment, the device UE1 200-1 may use a preconfigured probability value as an random resource select probability value. In yet another embodiment, the device UE1 200-1 may use a probability value defined per V2X application as an random resource select probability value.

When the UE1 200-1 is allocated the requested resource from the base station 100, the UE1 200-1 sends a periodic V2X service message using the allocated resource during the remaining transmission period (S653 and S654 of FIG. 6A).

By contrast, when the UE1 200-1 is not allocated the requested resource from the base station 100 and receives a resource allocation reject message including at least one of the random resource select probability value and the transmission period, the UE1 200-1 sends a periodic V2X service message by selecting an random resource according to an instruction of the base station 100 (S620, S653, and S654 of FIG. 6B). When receiving the resource allocation reject message from the base station 100, the UE1 200-1 selects an random resource using a preconfigured probability value from the preconfigured V2X resource and sends a periodic V2X service message.

Figure 7:
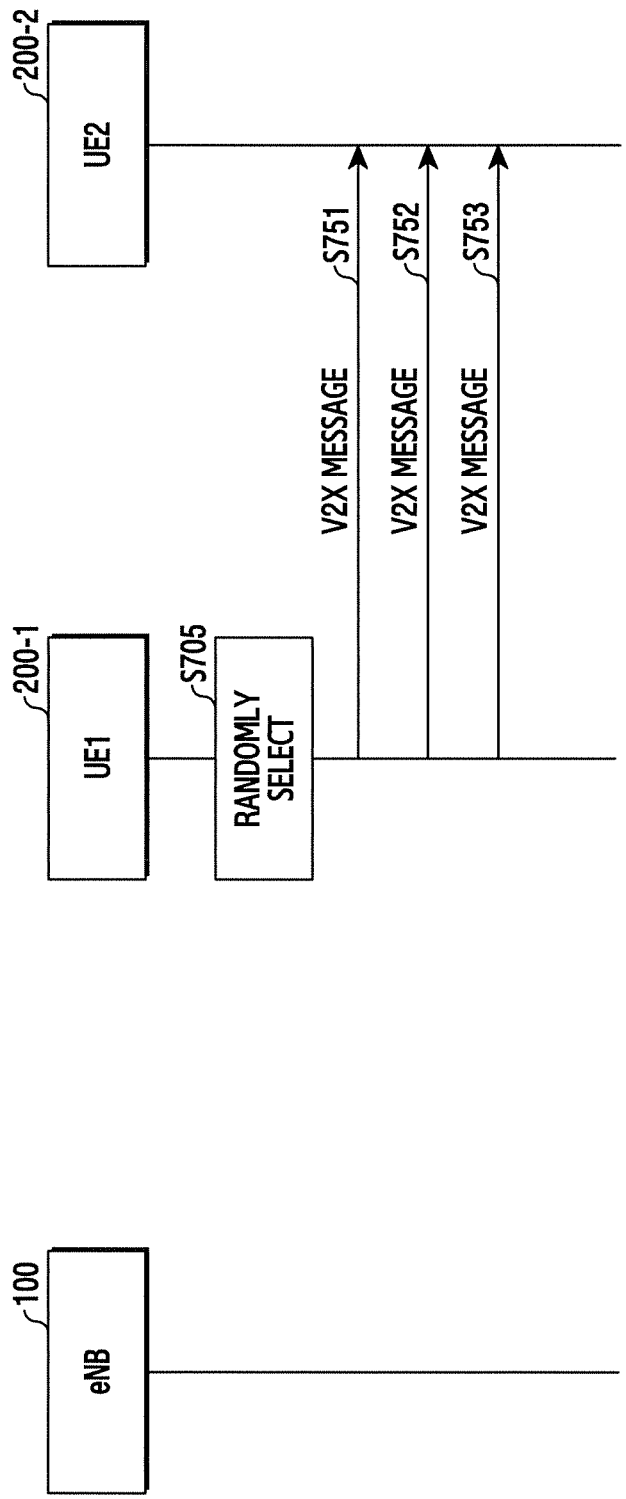
FIG. 7 is a diagram showing a procedure for processing resource allocation and vehicle service provision operations for a vehicle service according to a sixth embodiment of the present invention.

FIG. 7 is a diagram showing a procedure for processing resource allocation and vehicle service provision operations for a vehicle service according to a sixth embodiment of the present invention.

This embodiment corresponds to a case where a device UE1 200-1 which is to send a periodic V2X service message sends the periodic V2X service message (S705, S751, S752, and S753) by arbitrarily selecting a resource from a preconfigured V2X service message transmit resource. In one embodiment, when arbitrarily selecting the resource, the device UE1 200-1 may use the highest probability value as an random resource select probability value. In another embodiment, the device UE1 200-1 may use a preconfigured probability value as an random resource select probability value. In yet another embodiment, the device UE1 200-1 may use a probability value defined per V2X application as an random resource select probability value.

Figure 8:
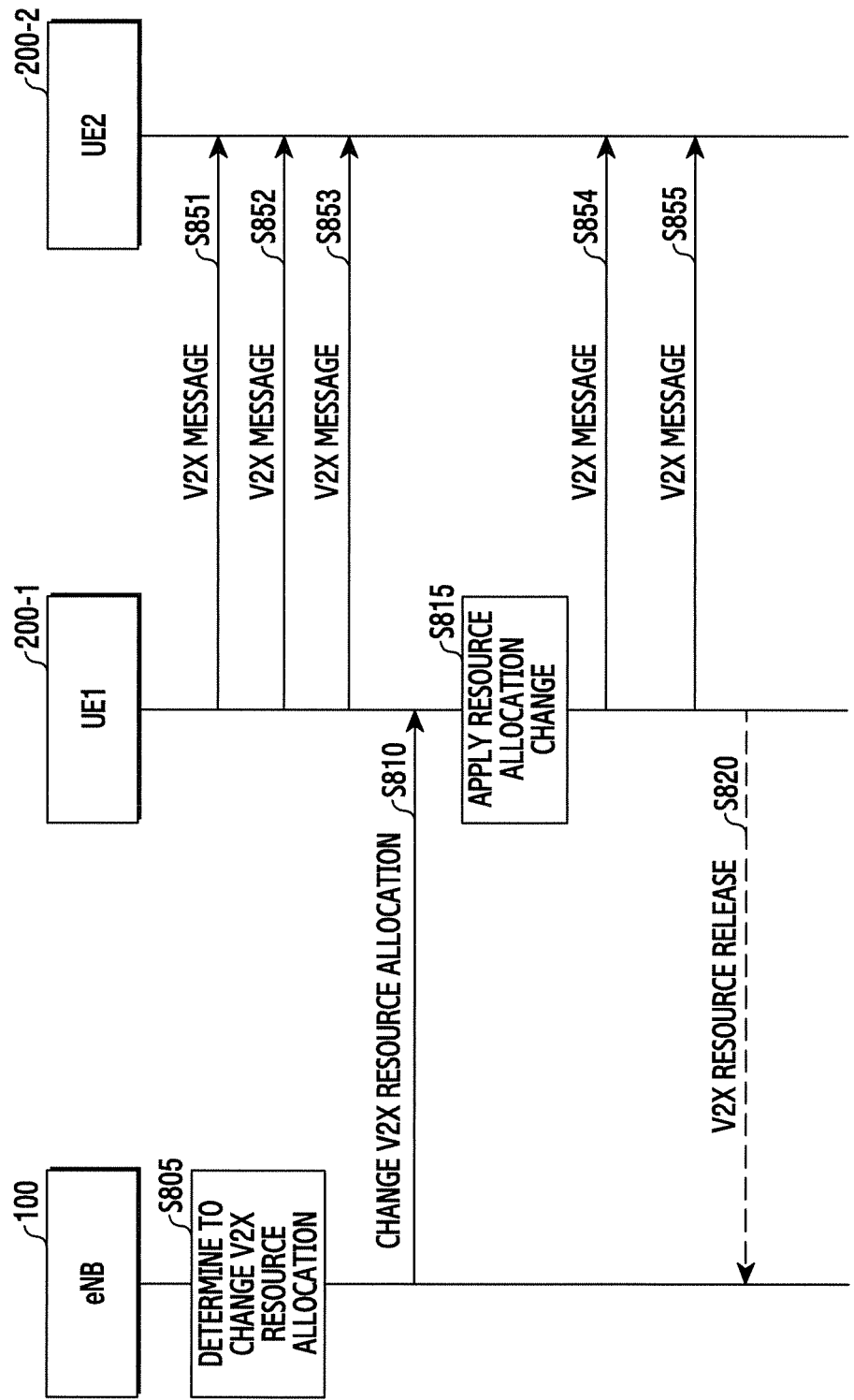
FIG. 8 is a diagram showing a procedure for processing resource allocation and vehicle service provision operations for a vehicle service according to a seventh embodiment of the present invention.

FIG. 8 is a diagram showing a procedure for processing resource allocation and vehicle service provision operations for a vehicle service according to a seventh embodiment of the present invention. This embodiment corresponds to a case where a device UE1 200-1 which is to send a periodic V2X service message periodically sends the V2X service message and sends the V2X service message using an allocated resource changed by a base station 100.

Referring to FIG. 8, the UE1 200-1 sends a periodic V2X service message to a UE2 200-2 (S851, S852, and S853). The UE2 200-2 receives the periodic V2X service messages (S851, S852, and S853). The transmission/reception resource of the periodic V2X service message may be allocated using any one of the methods described in the examples of FIG. 2 through FIG. 5.

The base station 100 determines to change resource allocation used in the periodic V2X service message transmission/reception (S805). In one embodiment, whether to change the resource allocation used in the periodic V2X service message transmission/reception may be determined according to the number of UEs sending/receiving the periodic V2X service message, a load of the periodic V2X service message, and a V2X service type requiring the periodic V2X service message. For example, when supporting a V2X service type 1 requiring the periodic V2X service message and a V2X service type 2 requiring the periodic V2X service message and finishing message transmission/reception of the V2X service type 1, the base station 100 may change the resource allocation for the message transmission/reception of the V2X service type 2.

The base station 100 sends the periodic V2X service transmission/reception resource allocation change indication message to the UE1 200-1 (S810). Also, the base station 100 may send the periodic V2X service transmission/reception resource allocation change indication to the UE2 200-2. In one embodiment, the resource allocation change indication message may include at least one of a resource allocation cycle, an allocated resource, an random resource select probability value, and time information for applying the random resource select probability value, of the UE1 200-1 for sending the periodic V2X service message.

In one embodiment, the resource allocation change indication message may be unicast from the base station 100 to the UE1 200-1 through the UE2 200-2, for example, transmitted as an RRC message. In another embodiment, the resource allocation change indication message may be included in a system information message, for example, a SIB broadcast by the base station 100. In yet another embodiment, the resource allocation change indication message may be included in the V2X service system information message transmitted by the base station 100. In still another embodiment, the resource allocation change indication message may be transmitted only to a UE subscribed to the periodic V2X service. In so doing, it may be included in a message transmitted to the V2X service group.

When receiving the periodic V2X service transmission/reception resource allocation change indication from the base station 100, the UE1 200-1 re-selects a periodic V2X service transmission resource according to the indication of the base station 100 (S815) and sends a periodic V2X service message using the selected resource (S854 and S855). For example, when the periodic V2X service transmission/reception resource allocation change indication is the random resource select probability value, the UE1 200-1 selects the periodic V2X service message transmission resource by applying the resource select probability value, and sends the periodic V2X service message. For example, when the periodic V2X service transmission/reception resource allocation change indication is a new allocated resource, the UE1 200-1 sends the periodic V2X service message using the new allocated resource.

The V2X service message transmitted from the UE1 200-1 is received at the UE2 200-2. In one embodiment, the resource of the UE2 200-2 for receiving the V2X service message is allocated by the base station 100 and may be identified from a message transmitted from the base station 100. In another embodiment, the resource of the UE2 200-2 for receiving the V2X service message may be a preconfigured resource.

When finishing the periodic V2X service message transmission, the UE1 200-1 may notify the periodic V2X service message transmission end to the base station 100 (S820). For example, the base station 100 may release the previously used resource after the V2X service message transmission cycle ends. When the V2X service message transmission ends, the base station 100 may send a message notifying the V2X service message reception end to the UE2 200-2.

In the embodiment of the present invention, when the UE 200-1 selects the resource for sending the periodic V2X service message by applying the random channel select probability value, the UE1 200-1 detects the selected resource and, when an energy is below a specific value, sends the periodic V2X service message over the selected resource. When the selected resource is detected and the energy exceeds the specific value, the UE1 200-1 waits until the energy falls below the specific value without sending the periodic V2X service message over the selected resource. Alternatively, when the energy of the selected resource exceeds the specific value, the UE1 200-1 sends the periodic V2X service message by temporarily selecting other resource (the resource having the energy below the specific value). An energy reference value of the detected channel may be set according to the V2X service type or defined arbitrarily by the base station.

According to embodiments of the present invention, a receiving terminal such as UE2 200-2 uses the resource to receive the periodic V2X service message as below.

In one embodiment, the UE2 200-2 monitors a V2X service message receiving resource pool and thus receives the periodic V2X service message. For example, the receiving resource pool is transmitted by the SIB message or the RRC message.

In another embodiment, the UE2 200-2 monitors resource allocation information indicated by a transmitting terminal such as UE1 200-1 and thus receives the periodic V2X service message. The resource allocation information indicated by the UE1 200-1 includes an indicator indicating the resource for the periodic V2X service message or an indicator indicating the periodic V2X service type. The UE2 200-2 determines the periodic V2X service transmission from the indicator or determines the periodic V2X service transmission of a particular type.

In another embodiment, the UE2 200-2 receives resource allocation information indicated by the base station 100 in the unicast manner and thus receives the periodic V2X service message. In so doing, the base station 100 notifies the resource for the UE2 200-2 to receive based on the resource allocated to the transmitting terminal UE1 200-1.

In another embodiment, the UE2 200-2 monitors a resource pool for its subscribed V2X service and thus receives the periodic V2X service message. Herein, the resource pool for the V2X service may utilize a different resource pool per V2X service type or a different service pool per V2X service priority.

Figure 9:
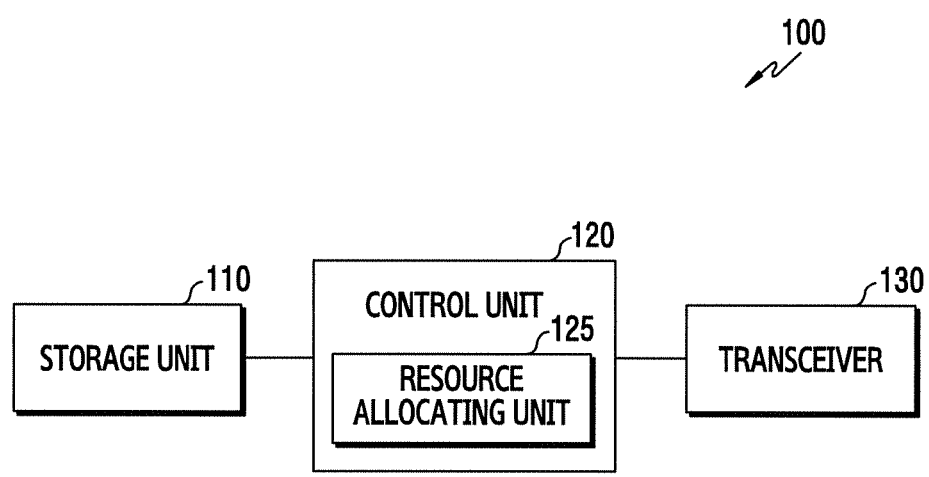
FIG. 9 is a diagram showing a configuration of a base station for a resource allocation operation for a vehicle service according to embodiments of the present invention.

FIG. 9 is a diagram showing a configuration of a base station for resource allocation operations for a vehicle service according to embodiments of the present invention. For example, such a configuration may be the configuration of the base station 100 of FIG. 2 through FIG. 8 as mentioned above.

Referring to FIG. 9, the base station 100 includes a storage unit 110, a control unit 120, and a transceiver 130. The control unit 120 may include a resource allocating unit 125. A term such as 'unit' or 'part' used herein indicates a unit for processing at least one function or operation, which may be implemented by hardware, software, or a combination of hardware and software.

The transceiver 130 performs functions for sending and receiving signals over a radio channel. For example, the transceiver 130 performs a conversion function between a baseband signal and a bit stream according to a physical layer standard of a system. For data transmission, the transceiver 130 generates complex symbols by encoding and modulating a transmit bit stream. In so doing, the transceiver 130 may map the complex symbols to subcarriers, and generate Orthogonal Frequency Division Multiplexing (OFDM) symbols through an Inverse Fast Fourier Transform (IFFT) operation. In data reception, the transceiver 130 restores a receive bit stream by demodulating and decoding a baseband signal. Also, the transceiver 130 up-converts the baseband signal to an RF band signal, transmits it over an antenna, and down-converts an RF band signal received via the antenna to a baseband signal. For example, the transceiver 130 may include a transmit filter, a receive filter, an amplifier, a mixer, an oscillator, a Digital to Analog Convertor (DAC), an Analog to Digital Convertor (ADC), and the like.

Also, the transceiver 130 may include a plurality of RF chains. In addition, the transceiver 130 may perform beamforming. For the beamforming, the transceiver 130 may adjust a phase and a magnitude of signals transmitted and received via a plurality of antennas or antenna elements. Also, the transceiver 130 may precode a plurality of data streams transmitted. Hence, the base station 100 may perform Multi-User Multiple Input Multiple Output (MU-MIMO). The transceiver 130 sends and receives the signals as mentioned above. Such a transceiver 130 may be referred to as a communication unit or a transceiving unit, and in some cases, may be divided into a transmitter and a receiver or into a transmitting unit and a receiving unit.

The storage unit 110 stores a basic program for the operations of the base station 100, an application program, and data such as setting information. Also, the storage unit 110 provides the stored data according to a request of the control unit 120.

The control unit 120 controls overall operations of the base station 100. For example, the control unit 120 transmits/receives signals through the transceiver 130. Also, the control unit 120 records data in the storage unit 110 and reads the recorded data from the storage unit 110. For doing so, the control unit 120 may include at least one processor.

The control unit 120 includes the resource allocating unit 125. The resource allocating unit 125 performs the resource allocation operation according to the processing procedures as aforementioned in FIG. 2 through FIG. 8. Based on priorities of a used resource allocated for a first service and a requested resource for a second service among entire preconfigured resource for a vehicle service, the resource allocating unit 125 or the control unit 120 allocates a resource for a UE which provides the second service.

In one embodiment, when the priority of the second service is greater than the priority of the first service, the control unit 120 may allocate the requested resource for the second service. For example, when the priority of the second service is greater than the priority of the first service and an available resource of the entire resource is smaller than the requested resource, the control unit 120 may allocate the used resource for the first service, for the second service. The resource allocation information may include information about the allocated resource.

For example, the control unit 120 allocates a common resource allocated for a common use by a plurality of vehicle services among the entire resource, as a resource for the first service. The control unit 120 allocates the common resource as the resource for the first service so as to utilize the common resource randomly with a particular probability value.

In another embodiment, when the priority of the second service is smaller than the priority of the first service, the control unit 120 may reject the allocation of the requested resource. For example, when the priority of the second service is smaller than the priority of the first service and an available resource of the entire resource is smaller than the requested resource, the control unit 120 may allocate the common resource as the resource for the first service so as to randomly utilize the common resource allocated for the common use by a plurality of vehicle services among the entire resource, with a particular probability value. The resource allocation information may include at least one of a resource allocation reject indicator, the particular probability value, and the transmission cycle to apply the particular probability value.

In yet another embodiment, when the priority of the second service is lower than the priority of the first service and the common resource is allocated as the resource for the first service such that the first service randomly utilizes the common resource allocated for the common use by a plurality of vehicle services among the entire resource, with a first probability value, the control unit 120 may reject the allocation of the requested resource. For example, the control unit 120 may allocate the common resource as the resource for the second service such that the second service randomly utilizes the common resource with a second probability value which is smaller than the first probability value. The resource allocation information may include at least one of a resource allocation reject indicator, the second probability value, and a transmission cycle to apply the second probability value.

In an embodiment, the control unit 120 may allocate the resource for the UE in response to resource request information received from the UE. The resource request information may include at least one of an indicator indicating vehicle service message transmission, the number of resources within a period, and the number of periods for periodic transmission.

Figure 10:
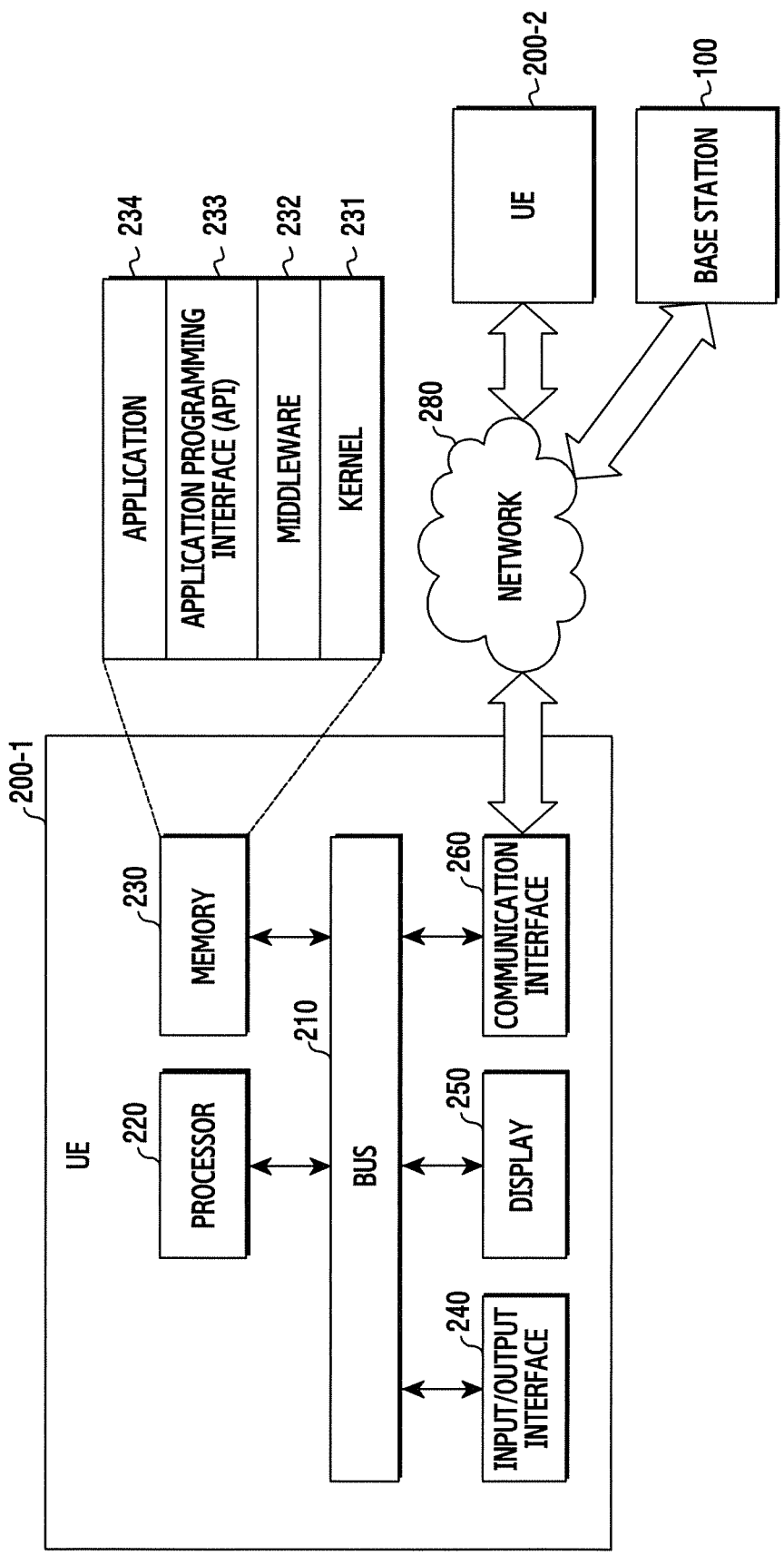
FIG. 10 is a diagram showing a configuration of a User Equipment (UE) for a resource allocation operation for a vehicle service according to embodiments of the present invention.

FIG. 10 is a diagram showing a configuration of a terminal for a resource allocation operation for a vehicle service according to embodiments of the present invention. For example, such a configuration may be the configuration of the UE1 200-1 of FIG. 2 through FIG. 8.

Referring to FIG. 10, the UE 200-1 includes a bus 210, a processor 220, a memory 230, an input/output interface 240, a display 250, and a communication interface 260.

The bus 210 may be a circuit for interconnecting the above-stated components and delivering communications (e.g., control messages) between the above-stated components.

The processor 220 may receive commands from the other components (e.g., the memory 230, the input/output interface 240, the display 250, the communication interface 260, etc.) through the bus 210, interpret the received commands, and perform arithmetic or data processing based on the interpreted commands.

The memory 230 may store commands or data received from the processor 220 or the other components (e.g., the input/output interface 240, the display 250, the communication interface 260, etc.) or created by the processor 220 or the other components.

The memory 230 may include programming modules such as a kernel 231, a middleware 232, an Application Programming Interface (API) 233, or an application 134. Each of the above-stated modules may include software, firmware, hardware, or a combination of at least two of them.

The kernel 231 may control or manage system resources (e.g., the bus 210, the processor 220, or the memory 230) used to execute operations or functions implemented by the other programming programs, for example, the middleware 232, the API 233, or the application program 234.

Also, the kernel 231 may provide an interface enabling the middleware 232, the API 233, or the application program 234 to access and control or manage an individual component of the UE 200-1.

The middleware 232 may serve an intermediary role for exchanging data between the API 233 or the application program 234 and the kernel 234 through communication. Also, in relation to job requests received from the application 234, the middleware 232 may control (e.g., schedule or load balance) the job request using a method by giving a priority for using the system resource (e.g., the bus 210, the processor 220, or the memory 230) of the UE 200-1 to at least one application of the application 234.

The API 233, as an interface through which the application 234 controls a function provided from the kernel 231 the middleware 232, may include, for example, at least one interface or function (e.g., an instruction) for file control, window control, image processing, or character control.

According to various embodiments of the present invention, the application 234 may execute the operations of the UE 200-1 of FIG. 2 through FIG. 8. Additionally or alternately, the application 234 may be an application relating to information (e.g., V2X service information) exchange between the UE 200-1 and an external UE (e.g., the UE 200-2). The application regarding the information exchange may include, for example, a notification relay application for delivering particular information to the UE 200-2, or a device management application for managing the UE 200-2.

According to various embodiments of the present invention, the application 234 may include an application designated according to a property (e.g., a type of an electronic device) of the external UE (e.g., the UE 200-2).

The input/output interface 240 may deliver commands or data inputted from a user through an input/output device (e.g., a sensor, a keyboard, or a touch screen) to, for example, the processor 220, the memory 230, and the communication interface 260 via the bus 210. For example, the input/output interface 240 may provide data regarding a user's touch input through a touch screen, to the processor 220. Also, the input/output interface 240 may output commands or data received from, for example, the processor 220, the memory 230, and the communication interface 260 via the bus 210, through the input/output device (e.g., a speaker or a display). For example, the input/output interface 240 may output sound data processed through the processor 220 to the user through the speaker.

The display 250 may display various information (e.g., multimedia data or text data) to the user.

The communication interface 260 may connect the communication between the UE 200-1 and the external device (e.g., the UE 200-2 or the base station 100). For example, the communication interface 260 may be connected to a network 280 and communicate with the external device through radio communication or wired communication. The wireless communication may include at least one of, for example, Wireless Fidelity (WiFi), Bluetooth (BT), Near Field Communication (NFC), Global Positioning System (GPS), or cellular communication (e.g., Long Term Evolution (LTE), LTE-Advanced (LTE-A), Code Division Multiple Access (CDMA), Wideband CDMA (WCDMA), Universal Mobile Telecommunications System (UMTS), Wireless Broadband (WiBro), or Global System for Mobile Communications (GSM)). The wired communication, for example, may include at least one of Universal Serial Bus (USB), High Definition Multimedia Interface (HDMI), Recommended Standard 232 (RS-232), or Plain Old Telephone Service (POTS). Such a communication interface 260 may be referred to as a communication unit, a transceiving unit, or a transceiver, and, in some cases, may be divided into a transmitter and a receiver or into a transmitting unit and a receiving unit.

According to an embodiment of the present invention, the network 280 may be a telecommunications network. The telecommunications network may include at least one of a computer network, Internet, Internet of things, or a telephone network. According to an embodiment, a protocol (e.g., transport layer protocol, data link layer protocol, or physical layer protocol) for the communication between the UE 200-1 and the external device may be supported by at least one of the application 234, the API 233, the middleware 232, the kernel 231, or the communication interface 260.

According to embodiments of the present invention, the UE 200-1 includes a receiver for receiving resource allocation information corresponding to resource request information from the base station 100, and a transmitter for transmitting the resource request information to the base station 100 and transmitting information for a second vehicle service to other UE 200-2 using an allocated resource of the resource allocation information. The allocated resource is allocated by the base station based on priorities of a used resource allocated for a first service and a requested resource for the second service among total preconfigured resource for a vehicle service.

According to an embodiment of the present invention, when the priority of the second service is greater than the priority of the first service, the requested resource may be allocated for the second service. For example, the priority of the second service is greater than the priority of the first service and an available resource of the total resource is smaller than the requested resource, the used resource for the first service may be allocated for the second service. The resource allocation information may include information about the allocated resource.

For example, a common resource allocated for a common use by a plurality of vehicle services among the total resource may be allocated as a resource for the first service. The common resource may be allocated as the resource for the first service such that the common resource is randomly used with a particular probability value.

According to another embodiment of the present invention, when the priority of the second service is smaller than the priority of the first service, allocation of the requested resource may be rejected. For example, when the priority of the second service is smaller than the priority of the first service and an available resource of the total resource is smaller than the requested resource, the common resource may be allocated as a resource for the second service so as to randomly utilize a common resource allocated for a common use by a plurality of vehicle services among the total resource, with a particular probability value. The resource allocation information may include at least one of a resource allocation reject indicator, the particular probability value, a transmission cycle for applying the particular probability value.

According to yet another embodiment of the present invention, when the priority of the second service is lower than the priority of the first service and the common resource is allocated as a resource for the first service such that the first service randomly utilizes the common resource allocated for a common use by a plurality of vehicle services among the total resource, with a particular probability value, allocation of the requested resource may be rejected. For example, the common resource may be allocated as the resource for the second service such that the second service randomly utilizes the common resource with a second probability value which is smaller than the first probability value. The resource allocation information may include at least one of a resource allocation reject indicator, the second probability value, a transmission cycle for applying the second probability value.

According to an embodiment of the present invention, the resource request information may include at least one of an indicator indicating vehicle service message transmission, the number of resources within a period, and the number of periods for periodic transmission.

Figure 11:
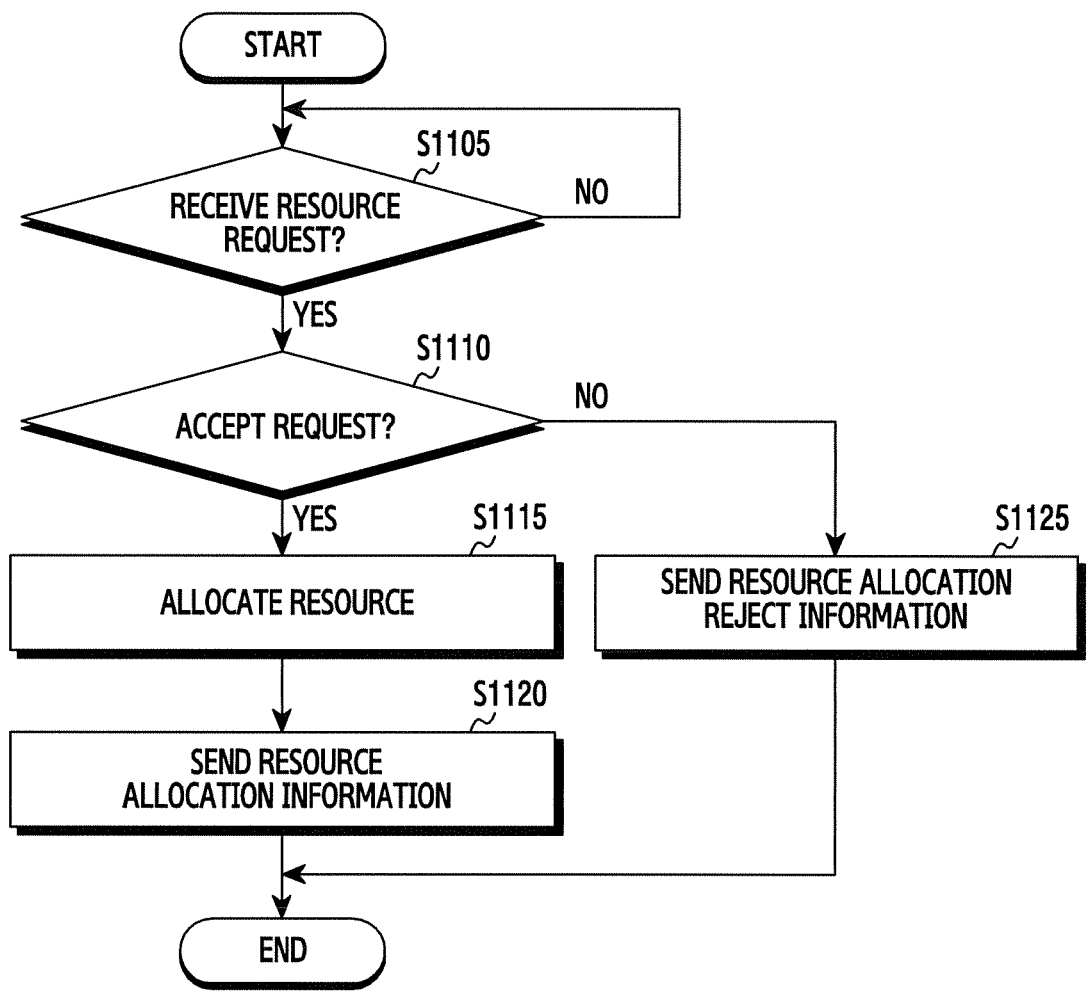
FIG. 11 is a diagram showing a processing flow of a resource allocation operation performed by a base station according to embodiments of the present invention.

FIG. 11 is a diagram showing a processing flow of a resource allocation operation performed by a base station according to embodiments of the present invention. For example, this flow may be conducted by the base station 100 of FIG. 2 through FIG. 8.

Referring to FIG. 11, the base station 100 determines whether a resource request is received from a UE in S1105. Upon receiving the resource request, the base station 100 determines whether to accept the resource request, that is, whether to allocate the requested resource in S1110.

When accepting the resource request, the base station 100 allocates the requested resource in S1115 and transmits information about the allocated resource to the UE in S1120. A specific example of such operations may be realized according to the processing procedure as shown in FIG. 2.

By contrast, when not accepting the resource request, the base station 100 may transmit resource allocation reject information of the requested resource to the UE in S1125. A specific example of such operations may be realized according to the processing procedure as shown in FIG. 3.

According to embodiments of the present invention, an operating method of a base station includes allocating a resource for a UE which provides a second service based on priorities of a used resource allocated for a first service and a requested resource for the second service among total preconfigured resource for a vehicle service, and transmitting the resource allocation information to the UE.

According to an embodiment of the present invention, allocating the resource may include, when the priority of the second service is greater than the priority of the first service, allocating the requested resource for the second service. For example, the priority of the second service is greater than the priority of the first service and an available resource of the total resource is smaller than the requested resource, allocating the resource may include allocating the used resource for the first service for the second service. The resource allocation information may include information about the allocated resource.

For example, allocating the resource may include allocating a common resource allocated for a common use by a plurality of vehicle services among the total resource as a resource for the first service. Allocating the resource may include allocating the common resource as the resource for the first service such that the common resource is randomly used with a particular probability value.

According to another embodiment of the present invention, allocating the resource may include, when the priority of the second service is smaller than the priority of the first service, rejecting allocation of the requested resource. For example, when the priority of the second service is smaller than the priority of the first service and an available resource of the total resource is smaller than the requested resource, allocating the resource may include allocating the common resource as a resource for the second service so as to randomly utilize a common resource allocated for a common use by a plurality of vehicle services among the total resource, with a particular probability value. The resource allocation information may include at least one of a resource allocation reject indicator, the particular probability value, a transmission cycle for applying the particular probability value.

According to yet another embodiment of the present invention, when the priority of the second service is lower than the priority of the first service and the common resource is allocated as a resource for the first service such that the first service randomly utilizes the common resource allocated for a common use by a plurality of vehicle services among the total resource, with a particular probability value, allocating the resource may include rejecting allocation of the requested resource.

For example, allocating the resource may include allocating the common resource as the resource for the second service such that the second service randomly utilizes the common resource with a second probability value which is smaller than the first probability value. The resource allocation information may include at least one of a resource allocation reject indicator, the second probability value, a transmission cycle for applying the second probability value.

According to an embodiment of the present invention, allocating the resource may include allocating a resource for the UE in response to resource request information received from the UE. The resource request information may include at least one of an indicator indicating vehicle service message transmission, the number of resources within a period, and the number of periods for periodic transmission.

Figure 12A:
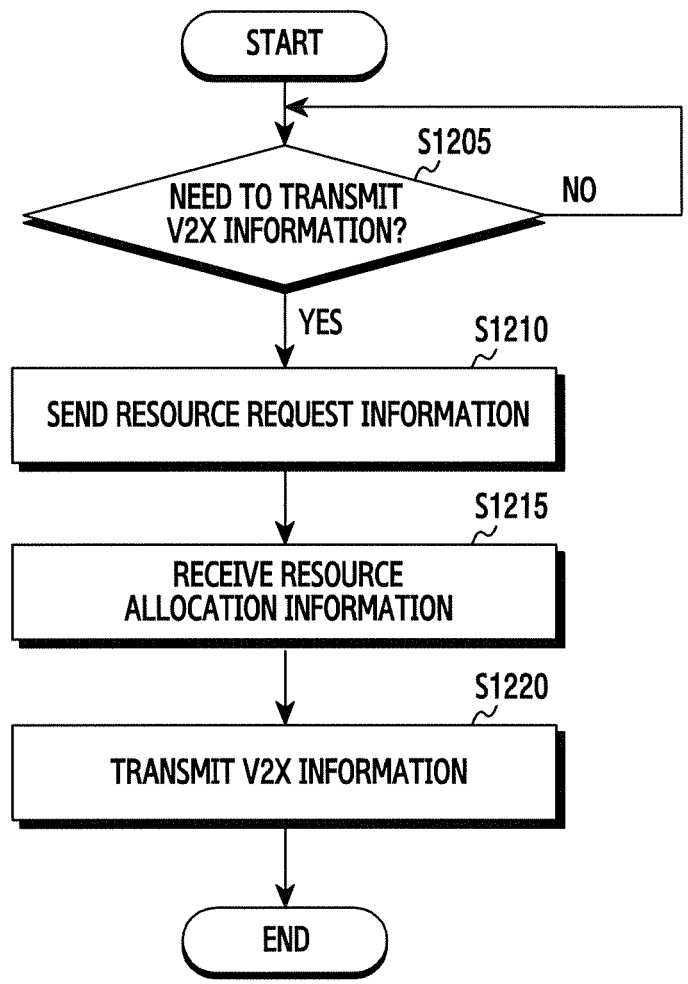
FIG. 12A is a diagram showing a processing flow of resource allocation information reception and vehicle service provision operations performed by a UE according to an embodiment of the present invention.

FIG. 12A is a diagram showing a processing flow of resource allocation information reception and receiving vehicle service provision performed by a UE according to an embodiment of the present invention. For example, such a flow may be conducted by the UE1 200-1 of FIG. 2 through FIG. 5.

Referring to FIG. 12A, the UE 200-1 determines whether transmission of V2X information is necessary in S1205. When requiring the V2X information transmission, the UE 200-1 transmits resource request information to the base station in S1210. The UE 200-1 receives resource allocation information responding to the resource request information from the base station in S1215. The UE 200-1 transmits V2X information to other UE using an allocated resource included in the received resource allocation information in S1210.

Figure 12B:
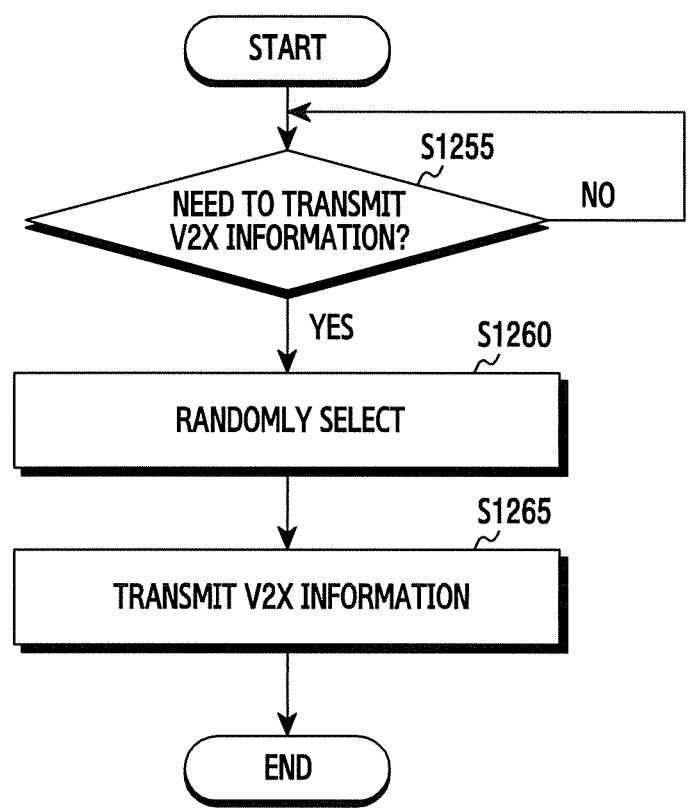
FIG. 12B is a diagram showing a processing flow of resource allocation information reception and vehicle service provision operations performed by a UE according to another embodiment of the present invention.

FIG. 12B is a diagram showing a processing flow of resource allocation information reception and vehicle service provision operations performed by a UE according to another embodiment of the present invention. For example, such a flow may be performed by the UE1 200-1 of FIG. 6A through FIG. 7.

Referring to FIG. 12B, the UE 200-1 determines whether transmission of V2X information is necessary in S1255. When requiring the V2X information transmission, the UE 200-1 selects an random resource from a preconfigured V2X information transmit resource in S1260. In S1265, the UE 200-1 transmits V2X information to other UE using the selected resource.

Figure 12C:
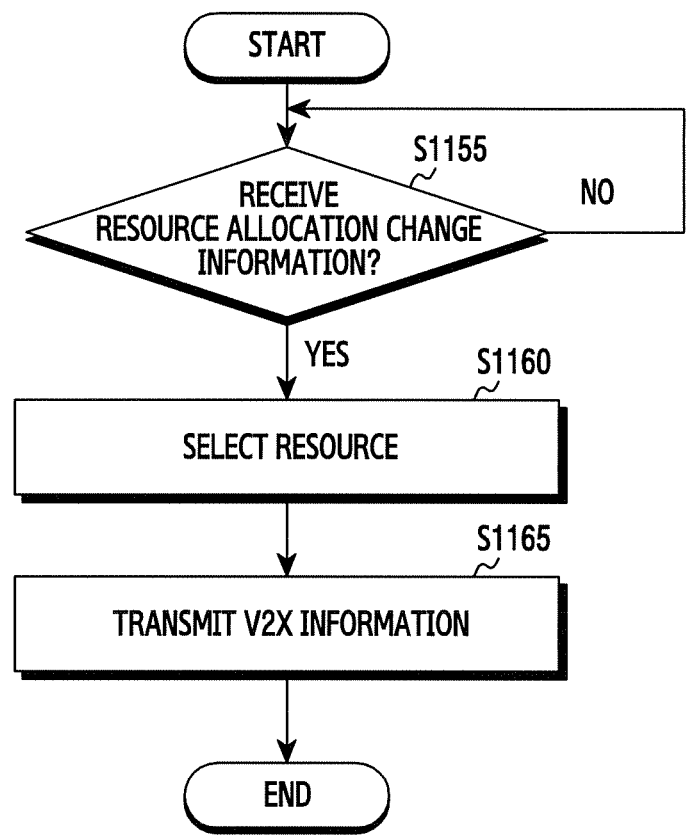
FIG. 12C is a diagram showing a processing flow of resource allocation information reception and vehicle service provision operations performed by a UE according to yet another embodiment of the present invention.

FIG. 12C is a diagram showing a processing flow of resource allocation information reception and vehicle service provision operations performed by a UE according to yet another embodiment of the present invention. For example, such a flow may be performed by the UE1 200-1 of FIG. 8.

Referring to FIG. 12C, the UE 200-1 determines whether resource allocation change information is received from the base station in S1155. Upon receiving the resource allocation change information, the UE 200-1 selects a new resource by applying the resource allocation change information in S1160. In S1165, the UE 200-1 transmits V2X information to other UE using the selected resource.

According to embodiments of the present invention, an operating method of an UE includes transmitting resource request information to a base station, receiving resource allocation information corresponding to resource request information from the base station, and transmitting the resource request information to the base station and transmitting information for a second vehicle service to other UE using an allocated resource of the resource allocation information. In an embodiment, the allocated resource is allocated by the base station based on priorities of a used resource allocated for a first service and a requested resource for the second service among total preconfigured resource for a vehicle service.

According to an embodiment of the present invention, when the priority of the second service is greater than the priority of the first service, the requested resource may be allocated for the second service. For example, the priority of the second service is greater than the priority of the first service and an available resource of the total resource is smaller than the requested resource, the used resource for the first service may be allocated for the second service. The resource allocation information may include information about the allocated resource.

For example, a common resource allocated for a common use by a plurality of vehicle services among the total resource may be allocated as a resource for the first service. The common resource may be allocated as the resource for the first service such that the common resource is randomly used with a particular probability value.

According to another embodiment of the present invention, when the priority of the second service is smaller than the priority of the first service, allocation of the requested resource may be rejected. For example, when the priority of the second service is smaller than the priority of the first service and an available resource of the total resource is smaller than the requested resource, the common resource may be allocated as a resource for the second service so as to randomly utilize a common resource allocated for a common use by a plurality of vehicle services among the total resource, with a particular probability value. The resource allocation information may include at least one of a resource allocation reject indicator, the particular probability value, a transmission cycle for applying the particular probability value.

According to yet another embodiment of the present invention, when the priority of the second service is lower than the priority of the first service and the common resource is allocated as a resource for the first service such that the first service randomly utilizes the common resource allocated for a common use by a plurality of vehicle services among the total resource, with a particular probability value, allocation of the requested resource may be rejected. For example, the common resource may be allocated as the resource for the second service such that the second service randomly utilizes the common resource with a second probability value which is smaller than the first probability value. The resource allocation information may include at least one of a resource allocation reject indicator, the second probability value, a transmission cycle for applying the second probability value.

According to an embodiment of the present invention, the resource request information may include at least one of an indicator indicating vehicle service message transmission, the number of resources within a period, and the number of periods for periodic transmission.

FIGS. 16 through 19 are diagrams showing examples of a reference model of a V2X communication system to which embodiments of the present invention are applied.

Figure 16:
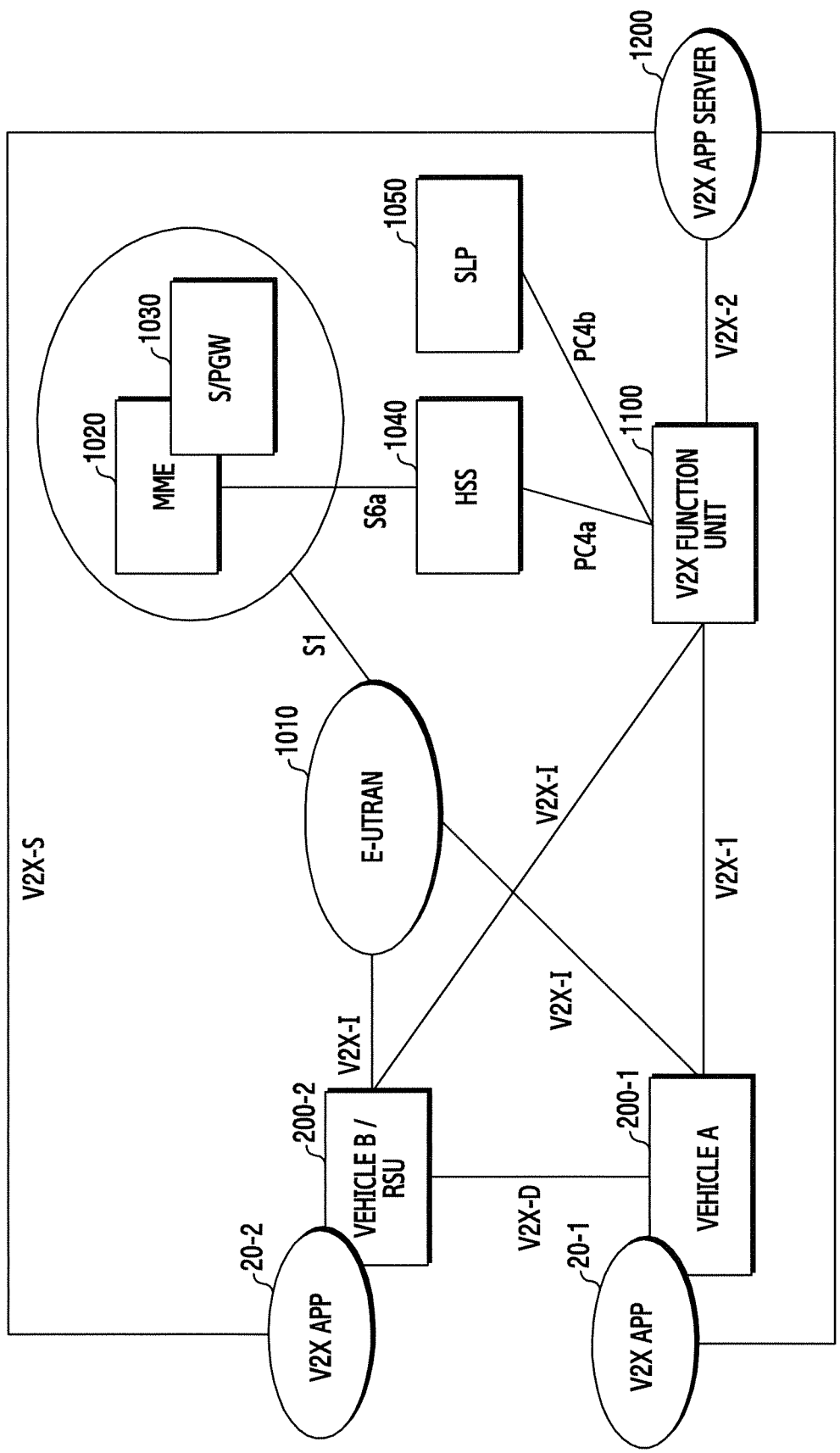
FIGS. 16 through 18 are diagrams showing examples of a reference model of a vehicle communication system to which embodiments of the present invention are applied.

FIG. 16 is a diagram showing a reference module of a V2X communication system according to an embodiment of the present invention.

Referring to FIG. 16, an Evolved Universal Terrestrial Radio Access Network (E-UTRAN) 1010, a Mobile Mobility Entity (MME) 1020, a Serving/Packet data network Gateway (S/PGW) 1030, a Home Subscriber Server (HSS) 1040, and a Service Location Protocol (SLP) 1050 are network entities of a wireless communication system (e.g., an LTE system). According to an embodiment of the present invention, a vehicle A 200-1 supporting a V2X communication service and a vehicle B/infrastructure (RSU) 200-2 operate a V2X app or applications 20-1 and 20-2 respectively. The V2X applications 20-1 and 20-2 are connected to a V2X application server 1200 through a V2X-S interface. Direct communication between the vehicle A 200-1 and the vehicle B/infrastructure (RSU) 200-2 is conducted through a V2X-D interface. The vehicle A 200-1 and the vehicle B/infrastructure (RSU) 200-2 are connected with the E-UTRAN 1010 through a V2X-I interface. The vehicle A 200-1 and the vehicle B/infrastructure (RSU) 200-2 are connected to a V2X function unit 1100 which controls the V2X communication service, through a V2X-1 interface. The V2X function unit 1100 is connected to the V2X application server 1200 through a V2X-2 interface.

Figure 17:
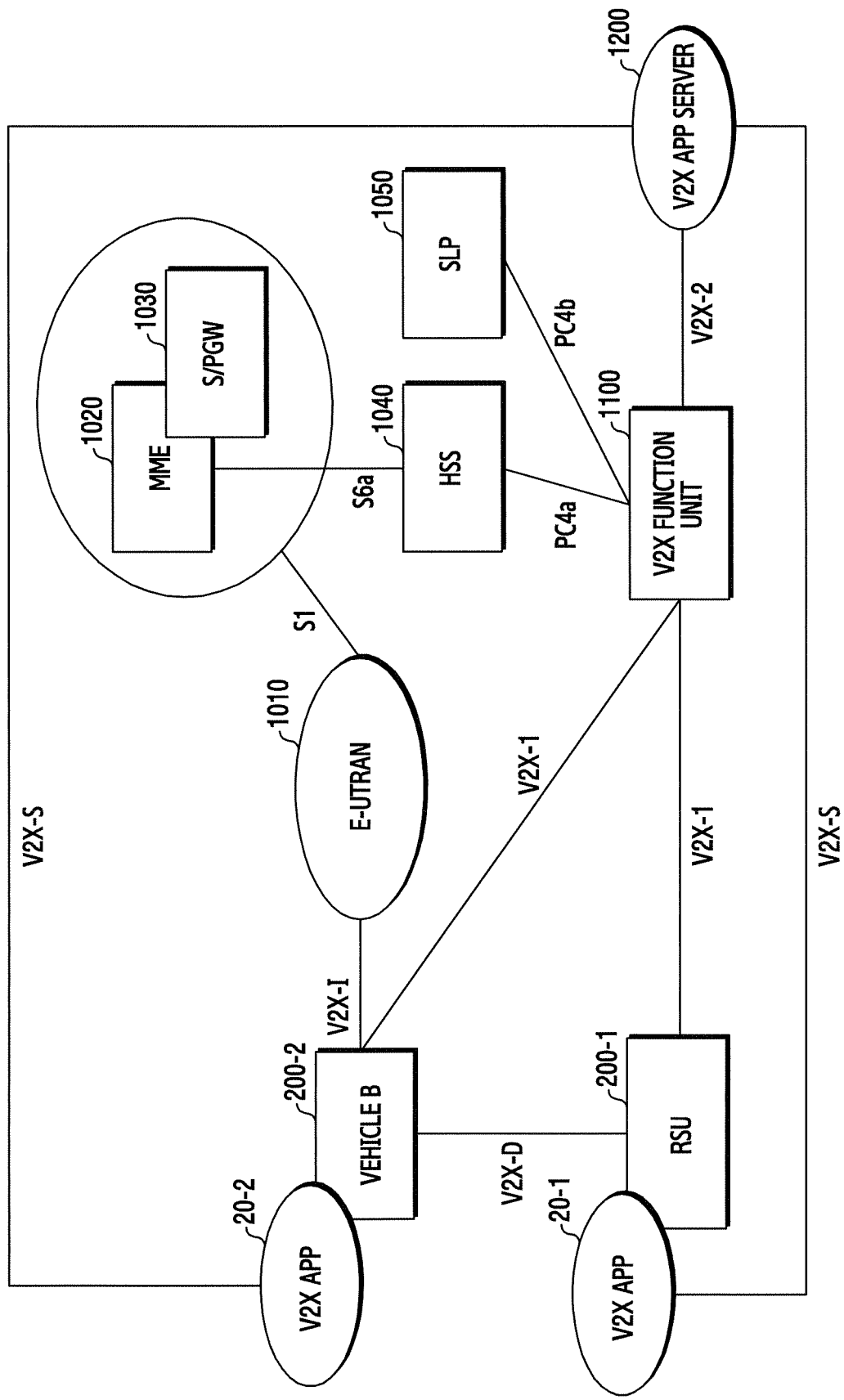

FIG. 17 is a diagram showing a reference module of a V2X communication system according to another embodiment of the present invention.

Referring to FIG. 17, an E-UTRAN 1010, an MME 1020, an S/PGW 1030, an HSS 1040, and an SLP 1050 are network entities of an LTE system. According to an embodiment of the present invention, a vehicle B 200-2 supporting a V2X communication service and an infrastructure (RSU) 200-1 operate V2X applications 20-1 and 20-2 respectively. The V2X applications 20-1 and 20-2 are connected to a V2X application server 1200 through a V2X-S interface. Direct communication between the vehicle B 200-2 and the infrastructure (RSU) 200-1 is conducted through a V2X-D interface. The vehicle B 200-2 is connected to the E-UTRAN 1010 through a V2X-I interface. The vehicle B 200-2 and the infrastructure (RSU) 200-1 are connected to a V2X function unit 1100 which controls the V2X communication service, through a V2X-1 interface. The V2X function unit 1100 is connected to the V2X application server 1200 through a V2X-2 interface. The infrastructure (RSU) 200-1 does not operate the interface V2X-I with the E-UTRAN 1010 and is connected to a backbone network (not shown) through a dedicated interface.

Figure 18:
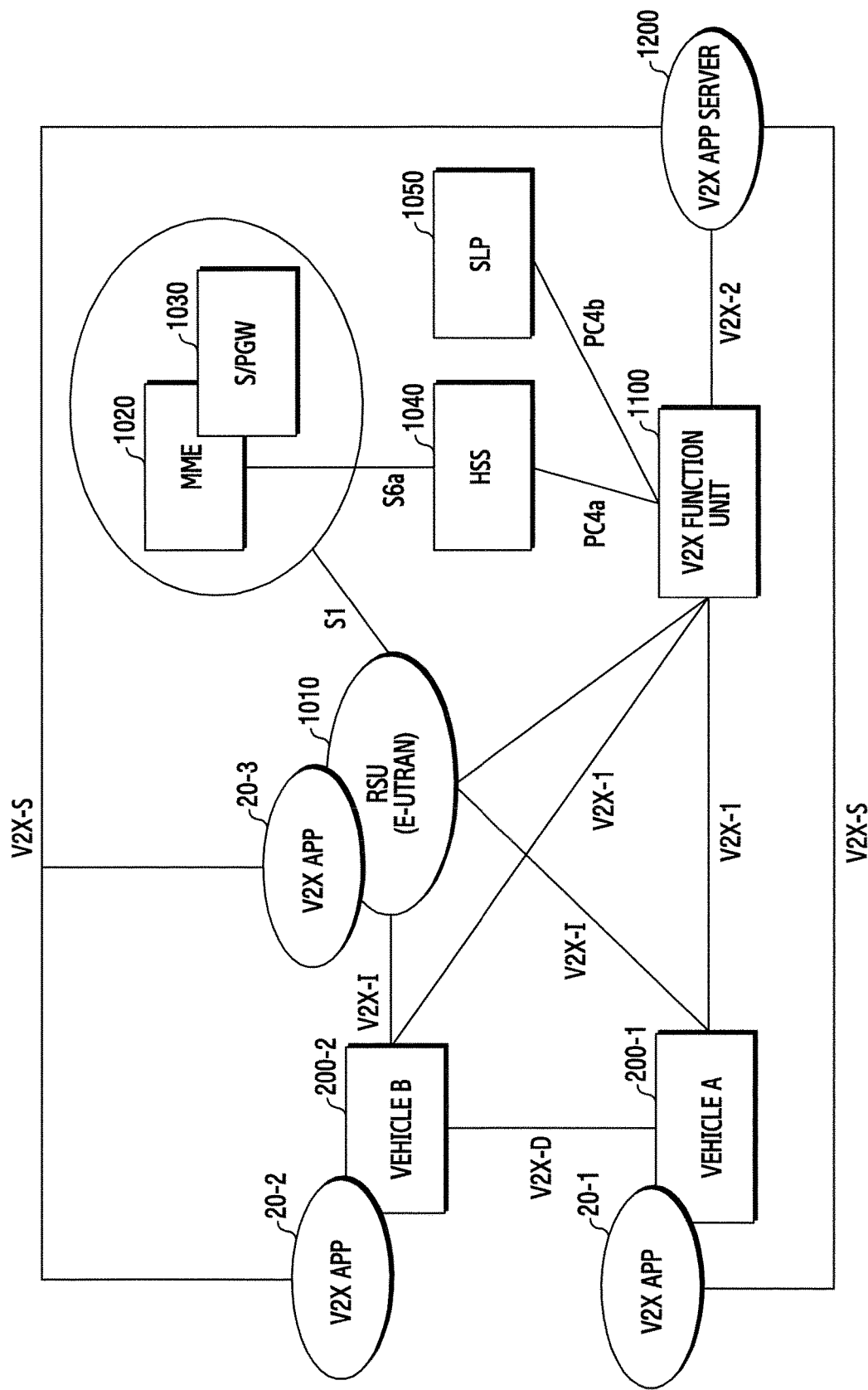

FIG. 18 is a diagram showing a reference module of a V2X communication system according to yet another embodiment of the present invention.

Referring to FIG. 18, an E-UTRAN 1010, an MME 1020, an S/PGW 1030, an HSS 1040, and an SLP 1050 are network entities of an LTE system. According to an embodiment of the present invention, a vehicle A 200-1 supporting a V2X communication service, a vehicle B 200-2, and an infrastructure (RSU) operate V2X applications 20-1, 20-2, and 20-3 respectively. The V2X applications 20-1, 20-2, and 20-3 are connected to a V2X application server 1200 through a V2X-S interface. Direct communication between the vehicle A 200-1 and the vehicle B 200-2 is conducted through a V2X-D interface. The vehicle A 200-1 and the vehicle B 200-2 are connected to the E-UTRAN 1010 through a V2X-I interface. The vehicle A 200-1 and the vehicle B 200-2 are connected to a V2X function unit 1100 which controls the V2X communication service, through a V2X-1 interface. The V2X function unit 1100 is connected to the V2X application server 1200 through a V2X-2 interface. The infrastructure (RSU) is operated as part of the E-UTRAN 1010, and, for example, may be installed as part of the base station or separately beside the base station. The infrastructure (RSU) is connected with the vehicle A 200-1 and the vehicle B 200-2 through the V2X-I interface. The infrastructure (RSU) is connected to the V2X function unit 1100 through the V2X-1 interface.

As set forth above, embodiments of the present invention provide a method for allocating a necessary resource for periodically sending/receiving the V2X service message in the V2X communication system which supports direct communication between vehicles. Embodiments of the present invention provide a method of the cellular base station for managing the resource of the V2X service message and controlling the resource allocation in the V2X direct communication system. The method according to embodiments of the present invention may support the low-latency service required by the V2X service and provide the high-reliability V2X direct communication by minimizing collisions in the resource use.

As above, the present invention has been described with the limited embodiments and drawings, but the present invention is not limited to the above embodiments and those skilled in the art of the present invention may make various modifications and changes from the disclosure.

Certain aspects of the present invention may also be embodied as computer readable code on a computer readable recording medium. The computer readable recording medium is any data storage device which may store data readable by a computer system. Examples of the computer readable recording medium include a Read Only Memory (ROM), a Random Access Memory (RAM), Compact Disc-ROMs (CD-ROMs), magnetic tapes, floppy disks, optical data storage devices, and carrier waves (like the data transmission via Internet). The computer readable recording medium may also be distributed over network-coupled computer systems, and accordingly the computer readable code is stored and executed in a distributed fashion. In addition, functional programs, code, and code segments for accomplishing the present invention may be easily construed by programmers skilled in the art to which the present invention pertains.

Also, it should be understood that the apparatus and the method according to an embodiment of the present invention may be implemented in hardware, software, or a combination of hardware and software. Such software may be stored in, for example, regardless of it is erasable or re-writable, a volatile or non-volatile storage device such as a storage device such as ROM, or, for example, a memory such as a RAM, a memory chip, a device, or an integrated circuit, or, for example, a storage medium which is optically or magnetically recordable and machine-readable (e.g., computer-readable) such as a CD, a DVD, a magnetic disk, or a magnetic tape. A method according to an embodiment of the present invention may be implemented by a computer or a portable terminal including a controller and a memory, and the memory is an example of a machine-readable storage medium suitable to store a program or programs including instructions for implementing embodiments of the present invention.

Hence, the present invention includes a program including code for implementing the apparatus or the method defined in claims of the present specification and a machine-readable (computer-readable) storage medium storing such a program. Also, such a program may be electronically transferred through a medium such as communication signal carried through a wired or wireless connection, and the present invention appropriately includes equivalents thereof.

Also, the apparatus according to an embodiment of the present invention may receive and store the program from a program providing device wiredly or wirelessly connected. The program providing device may include a program including instructions for making the program providing device fulfill a preconfigured content protecting method, a memory for storing necessary information for the content protecting method, a communication unit for performing wired or wireless communication with the graphic processing device, and a control unit for sending a corresponding program to the transceiving device as requested by the graphic processing device or automatically.

While the specification of the present invention has described certain embodiments thereof, it will be understood that various changes may be made therein without departing from the spirit and scope of the invention. Hence, the scope of the present invention is not limited to the mentioned embodiment and should be defined by the appended claims and their equivalents.

The invention claimed is:

1. A first terminal in a wireless communication system, the first terminal comprising:
   at least one transceiver; and
   at least one processor configured to:
      transmit, to a base station, a first message related to a traffic for a vehicle to everything (V2X) communication;
      receive, from the base station, a second message related to a resource allocated for the traffic for the V2X communication, wherein the resource is allocated based on a priority associated with the traffic for the V2X communication; and
      transmit, to a second terminal, the traffic for the V2X communication using the resource,
   wherein the first message includes information associated with a periodicity of the traffic for the V2X communication.

2. The first terminal of claim 1, wherein the at least one processor is further configured to:
   receive resource allocation information for a common resource, the resource allocation information including information associated with a probability value.

3. A base station in a wireless communication system, the base station comprising:
   at least one transceiver; and
   at least one processor configured to:
      receive, from a first terminal, a first message related to a traffic for a vehicle to everything (V2X) communication between the first terminal and a second terminal; and
      transmit, to the first terminal, a second message related to a resource allocated for transmitting the traffic for the V2X communication, wherein the resource is allocated based on a priority associated with the traffic for the V2X communication,
   wherein the first message includes information associated with a periodicity of the traffic for the V2X communication.

4. A method performed by a first terminal in a wireless communication system, the method comprising:
   transmitting, to a base station, a first message related to a traffic for a vehicle to everything (V2X) communication;
   receiving, from the base station, a second message related to a resource allocated for transmitting the traffic for the V2X communication, wherein the resource is allocated based on a priority associated with the traffic for the V2X communication; and
   transmitting, to a second terminal, the traffic for the V2X communication using the resource,
   wherein the first message includes information associated with a periodicity of the traffic for the V2X communication.

5. The first terminal of the claim 1, wherein the at least one processor is further configured to:
   if the periodicity of the traffic for the V2X communication is changed, control the at least one transceiver to transmit, to the base station, another message including information related to the changed periodicity of the traffic for the V2X communication.

6. The first terminal of the claim 1, wherein the first message includes information indicating the priority associated with the traffic for the V2X communication.

7. The base station of the claim 3, wherein the first message is transmitted based on a change of the periodicity of the traffic for the V2X communication.

8. The method of the claim 4, further comprising:
if the periodicity of the traffic for the V2X communication is changed, transmitting, to the base station, another message including information related to the changed periodicity of the traffic for the V2X communication.

9. The method of the claim 4, wherein the first message includes information indicating the priority associated with the traffic for the V2X communication.

10. The first terminal of claim 1,
wherein the second message includes information associated with a cycle of resource allocation for the V2X communication.

11. The first terminal of claim 1,
wherein the first message includes information for indicating that the traffic is associated with a periodic transmission for the V2X communication.

12. The base station of claim 3,
wherein the second message includes information associated with a cycle of resource allocation for the V2X communication.

13. The base station of claim 3,
wherein the first message includes information for indicating that the traffic is associated with a periodic transmission for the V2X communication.

14. The method of claim 4,
wherein the second message includes information associated with a cycle of resource allocation for the V2X communication.

15. The method of claim 4,
wherein the first message includes information for indicating that the traffic is associated with a periodic transmission for the V2X communication.

16. The method of the claim 4, further comprising: receiving resource allocation information for a common resource, the resource allocation information including information associated with a probability value.

* * * * *